United States Patent
Koren et al.

(10) Patent No.: US 10,220,646 B2
(45) Date of Patent: Mar. 5, 2019

(54) METHOD AND SYSTEM FOR BOOK READING ENHANCEMENT

(75) Inventors: Amir Koren, Ramot-HaShavim (IL); Roei Simantov, Kfar-Saba (IL); Ido Leichter, Haifa (IL); Denis Simakov, Jerusalem (IL)

(73) Assignee: SparkUp Ltd., Tel-Mond (IL)

( * ) Notice: Subject to any disclaimer, the term of this patent is extended or adjusted under 35 U.S.C. 154(b) by 0 days.

(21) Appl. No.: 13/808,878

(22) PCT Filed: Jul. 6, 2011

(86) PCT No.: PCT/IL2011/000532
§ 371 (c)(1),
(2), (4) Date: Mar. 20, 2013

(87) PCT Pub. No.: WO2012/004792
PCT Pub. Date: Jan. 12, 2012

(65) Prior Publication Data
US 2013/0168954 A1    Jul. 4, 2013

Related U.S. Application Data

(60) Provisional application No. 61/361,582, filed on Jul. 6, 2010.

(51) Int. Cl.
*B42D 15/00* (2006.01)
*G09B 5/06* (2006.01)
(Continued)

(52) U.S. Cl.
CPC ........... *B42D 15/00* (2013.01); *G06F 17/241* (2013.01); *G06K 9/00483* (2013.01);
(Continued)

(58) Field of Classification Search
CPC . G06K 9/00; G09B 5/062; G09B 5/06; G09B 21/006; B42D 3/123
(Continued)

(56) References Cited

U.S. PATENT DOCUMENTS 4,884,974 A * 12/1989 DeSmet ................. 434/317
6,115,482 A *  9/2000 Sears et al. ............. 382/114
(Continued)

FOREIGN PATENT DOCUMENTS

CN    1639755    7/2005
CN    1695156    11/2005
(Continued)

OTHER PUBLICATIONS

Communication Pursuant to Article 94(3) EPC dated Apr. 20, 2017 From the European Patent Office Re. Application No. 11803237.4. (6 Pages).
(Continued)

*Primary Examiner* — Bruk Gebremichael

(57) ABSTRACT

A method and system for enhancement of a readable media is disclosed and may include a housing configured to be removably attached to a readable media, a processor, a sensor coupled to the processor and connected to said housing wherein the sensor is adapted to sense a current position associated with the readable media by recognition with the processor of at least a part of the readable media, a memory storing therein an acoustic or other enhancement effects, an acoustic transducer, or a projector which reads out said acoustic enhancement into an acoustic stream or projects a visual effect and a memory storing therein an association between said enhancements and at least an indication of said position associated with the readable media.

20 Claims, 17 Drawing Sheets

(51) Int. Cl.
*G06K 9/00* (2006.01)
*G06K 9/20* (2006.01)
*G06F 17/24* (2006.01)

(52) U.S. Cl.
CPC .......... *G06K 9/209* (2013.01); *G06K 9/2054* (2013.01); *G09B 5/062* (2013.01)

(58) Field of Classification Search
USPC .................. 434/317, 112, 308, 319, 320
See application file for complete search history.

(56) References Cited

U.S. PATENT DOCUMENTS

| | | | |
|---|---|---|---|
| 6,516,181 B1 | 2/2003 | Kirwan | |
| 6,947,571 B1* | 9/2005 | Rhoads | G06Q 30/02 382/100 |
| 7,261,612 B1 | 8/2007 | Hannigan et al. | |
| 7,328,845 B2 | 2/2008 | Tsai | |
| 7,422,434 B1 | 9/2008 | Krey et al. | |
| 7,639,406 B1* | 12/2009 | Proudfoot | H04N 1/19594 358/464 |
| 7,865,817 B2 | 1/2011 | Ryan et al. | |
| 7,914,468 B2 | 3/2011 | Shalon et al. | |
| 8,298,060 B2 | 10/2012 | Weichselbaum | |
| 8,407,603 B2 | 3/2013 | Christie et al. | |
| 8,468,244 B2 | 6/2013 | Redlich et al. | |
| 8,799,401 B1* | 8/2014 | Bryar | G06F 17/30253 709/217 |
| 2004/0091842 A1* | 5/2004 | Carro | 434/112 |
| 2006/0064037 A1 | 3/2006 | Shalon et al. | |
| 2006/0151947 A1 | 7/2006 | Fredrickson | |
| 2007/0067345 A1* | 3/2007 | Li | G06F 17/30864 |
| 2007/0088712 A1 | 4/2007 | Watson et al. | |
| 2007/0194127 A1 | 8/2007 | Rathus et al. | |
| 2007/0195380 A1* | 8/2007 | Machida | H04N 1/00681 358/498 |
| 2007/0292026 A1 | 12/2007 | Reznik et al. | |
| 2008/0122805 A1* | 5/2008 | Smith | A63F 13/06 345/175 |
| 2008/0163039 A1 | 7/2008 | Ryan et al. | |
| 2009/0177981 A1 | 7/2009 | Christie | |
| 2009/0254572 A1 | 10/2009 | Redlich et al. | |
| 2009/0258687 A1 | 10/2009 | Weichselbaum | |
| 2009/0268039 A1 | 10/2009 | Yi | |
| 2009/0317778 A1 | 12/2009 | Oberman | |
| 2010/0076642 A1 | 3/2010 | Hoffberg et al. | |
| 2013/0050482 A1 | 2/2013 | Choi | |

FOREIGN PATENT DOCUMENTS

| | | |
|---|---|---|
| CN | 1707552 | 12/2005 |
| CN | 1710596 | 12/2005 |
| CN | 201097383 | 8/2008 |
| CN | 201315627 | 9/2009 |
| CN | 101572020 | 11/2009 |
| CN | 101882421 | 11/2010 |
| EP | 2138957 | 12/2009 |
| GB | 2444793 | 6/2008 |
| KR | 20040099642 | 12/2004 |
| KR | 20080090117 | 10/2008 |
| WO | WO 2005/093553 | 10/2005 |
| WO | WO 2012/004792 | 1/2012 |

OTHER PUBLICATIONS

International Preliminary Report on Patentability dated Jan. 17, 2013 From the International Bureau of WIPO Re. Application No. PCT/IL2011/000532. (7 Pages).
International Search Report and the Written Opinion dated Dec. 2, 2011 From the International Searching Authority Re. Application No. PCT/IL2011/000532. (7 Pages).
Arai et al. "PaperLink: A Technique for Hyperlinking From Real Paper to Electronic Content", Proceedings of the ACM SIGCHI Conference on Human Factors in Computing Systems, CHI'97, Atlanta, GA, USA, Mar. 22-27, 1997, XP000697132, p. 327-335, Mar. 22, 1997.
Arai et al. "PaperLink: A Technique for Hyperlinking From Real Paper to Electronic Content", Proceedings of the SIGCHI Conference on Human Factors in Computing Systems, XP055363762, Retrieved From the Internet, p. 1-12, Mar. 27, 1997.
Communication Pursuant to Rule 164(1) EPC [Supplementary Partial European Search Report] dated Feb. 22, 2016 From the European Patent Office Re. Application No. 11803237.4. (8 Pages).
Supplementary European Search Report and the European Search Opinion dated Jun. 23, 2016 From the European Patent Office Re. Application No. 11803237.4. (11 Pages).
Nakashima et al. "Book Flipping Scanning", Adjunct Proceedings of the 22nd Symposium on User Interface Software and Technology, UIST'09, XP055125161, Victoria, BC, Canada, Oct. 4-7, 2009, p. 79-80, Oct. 4, 2009.
Communication Pursuant to Article 94(3) EPC dated Nov. 28, 2017 From the European Patent Office Re. Application No. 11803237.4. (8 Pages).
Aust "Augmenting Paper Documents With Digital Information in a Mobile Environment", Diplomarbeit, Lehrstuhl VII, Fachbereich Informatik, Universitat Dortmund, XP002262121, 47 P., Sep. 3, 1996.
Summons to Attend Oral Proceedings Pursuant to Rule 115(1) EPC dated Jun. 13, 2018 From the European Patent Office Re. Application No. 11803237.4. (9 Pages).
Result of Consultation Dated Nov. 9, 2018 From the European Patent Office Re. Application No. 11803237.4. (8 Pages).

* cited by examiner

Fig. 5
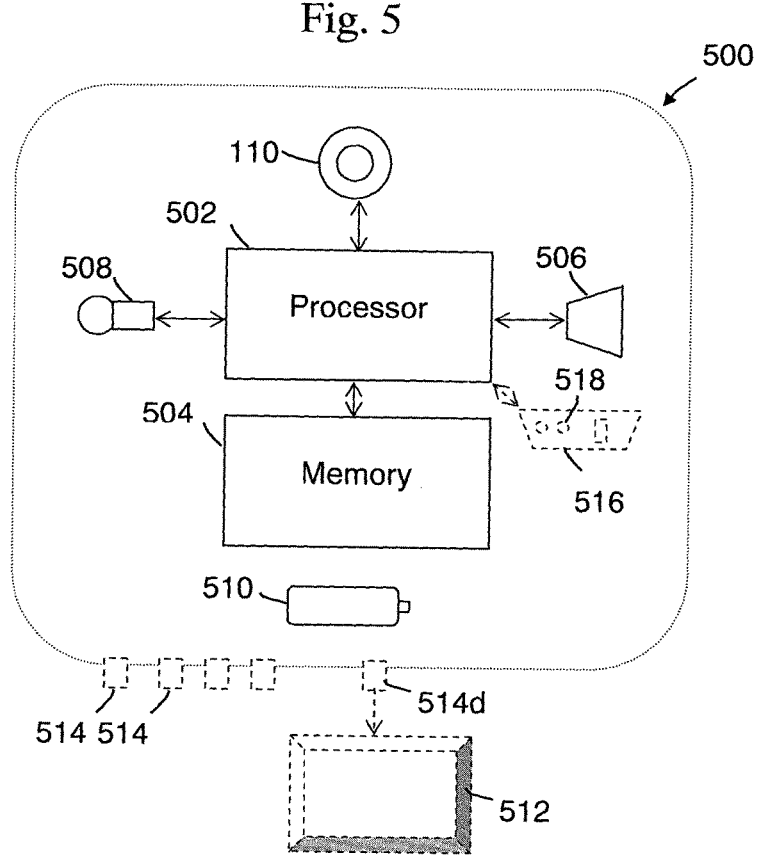
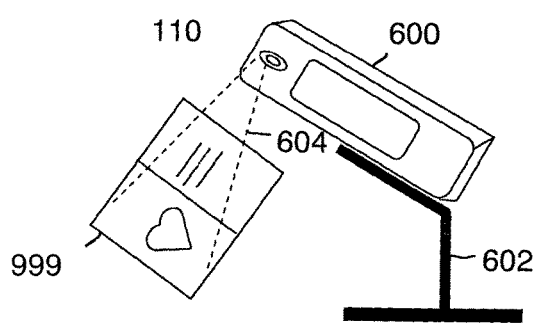
Fig. 6A
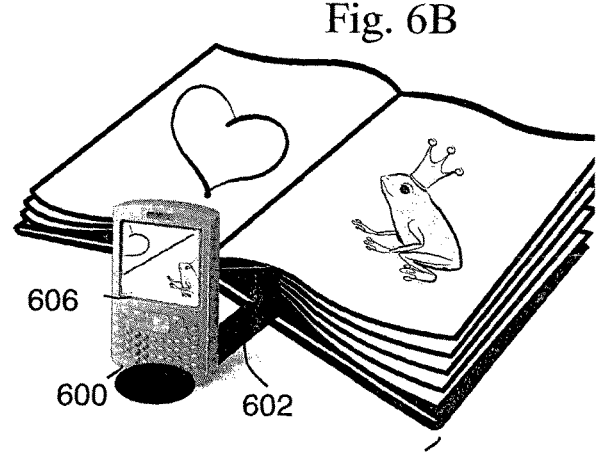
Fig. 6B

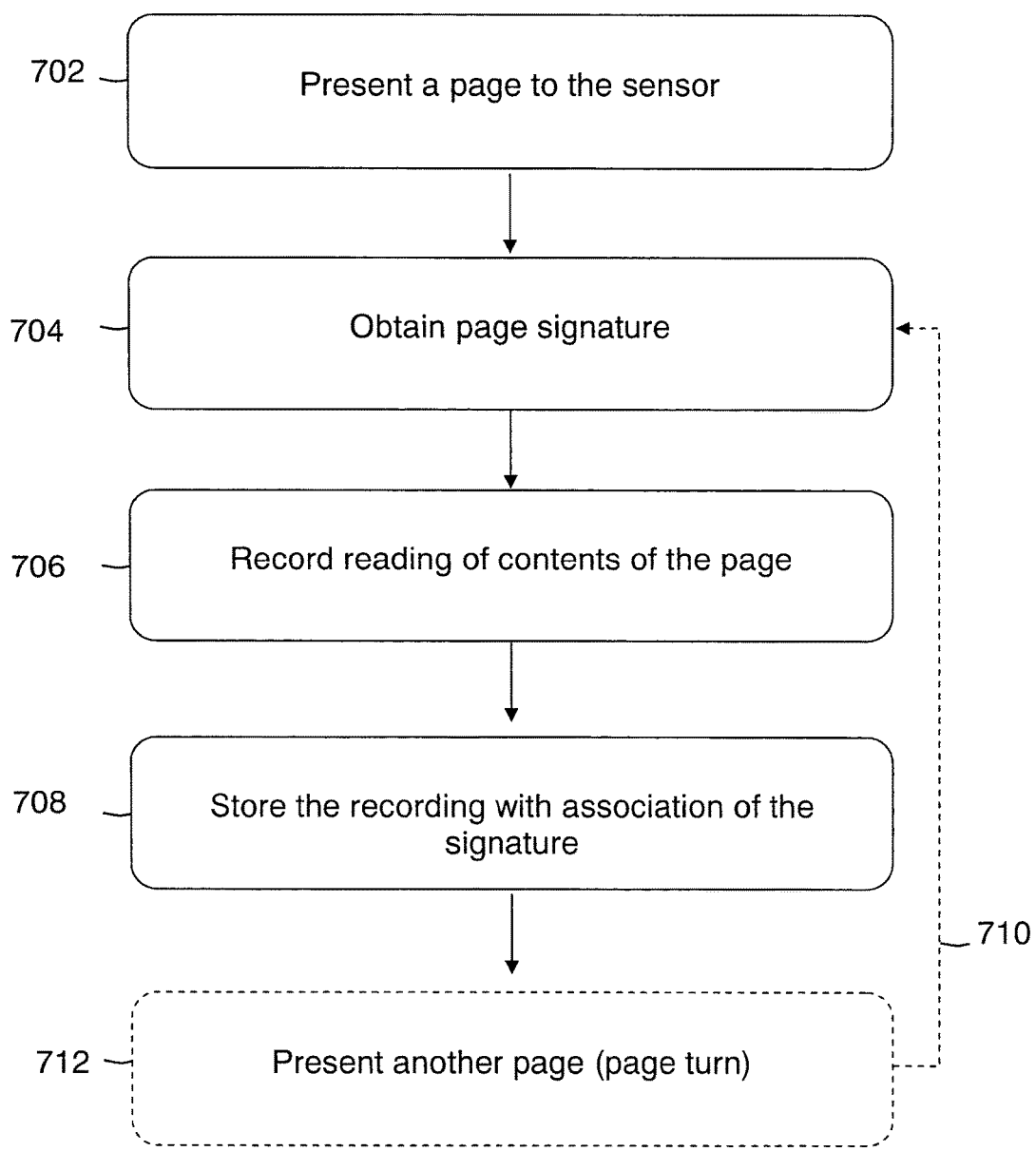

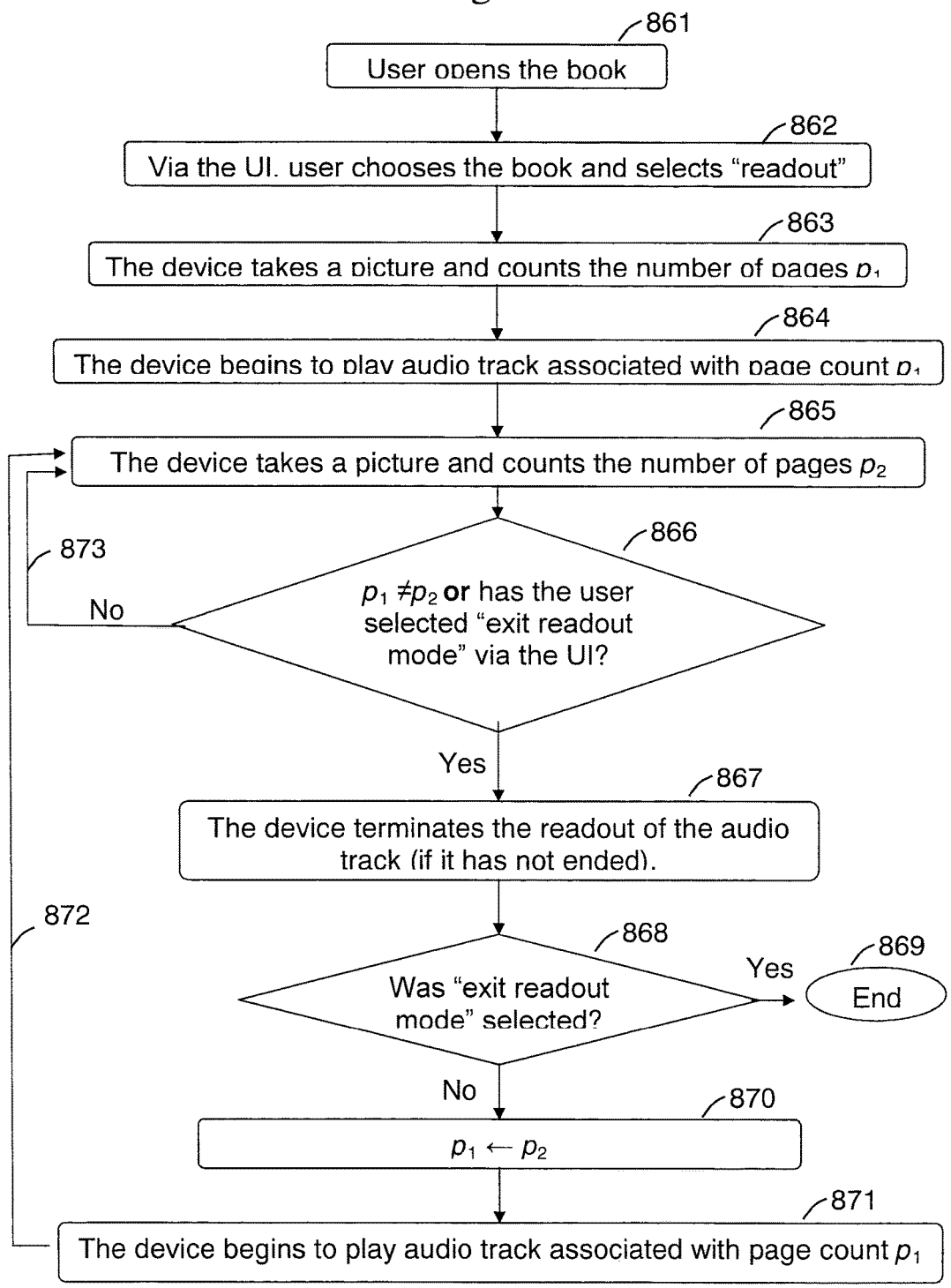

METHOD AND SYSTEM FOR BOOK READING ENHANCEMENT

CROSS-REFERENCE TO RELATED APPLICATIONS/INCORPORATION BY REFERENCE

The present application is a National Phase entry of PCT Application No. PCT/IL2011/000532, filed Jul. 6, 2011, which makes reference to and claims priority from U.S. Provisional Application Ser. No. 61/361,582 filed on Jul. 6, 2010, both which are hereby incorporated herein by reference in their entirety.

FIELD OF THE INVENTION

Certain embodiments of the invention relate to consumer electronics. More specifically, certain embodiments of the invention relate to a method and system for enhancing readable medium

BACKGROUND OF THE INVENTION

Personalized reading of a book is known in the art. For example, US Application 2009/0317778 discloses a reading interaction between two parties over the internet, or, for example, U.S. Pat. No. 7,422,434 discloses using a recorder to capture a voice reading a book aloud and playing the reading at a later time.

Recording and replay of books with respect to particular pages is also known. For example, U.S. Pat. No. 6,516,181 discloses using buttons indicating the page being read and the page to be replayed, or, for example, US Application 2007/0088712 that discloses a service for presenting a book and recording the contents thereof. In another example, GB 2444793 disclosed electric or electronic apparatus for identifying a book and pages thereof, for example, using special coded pages.

KR 20080090117A discloses identifying a book by a special code attached to the book, and reading out contents of the book and/or recordings associated with book pages, possibly by identifying page numbers using recognitions methods such as OCR.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

In one embodiment, the invention provides systems and/or methods for enhancing readable material, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

A general aspect of some embodiments of the present invention relates to enhancing readable media audibly or visually or audio-visually with respect to contents therein responsive to individual triggers.

According to an aspect of some embodiments of the present invention there is provided a system for enhancing readable media, comprising: a housing configured to be removably and operably connected to a readable media; a processor; a sensor coupled to the processor and connected to said housing, the sensor configured to sense a current trigger associated with a section of the readable media by recognition with the processor of at least a part of the section of the readable media; and an enhancement library.

In another embodiment, the invention provides a method for adding enhancing content to a readable medium, the method comprising: recognizing, with a sensor, a visual trigger associated with the readable medium; and communicating an enhancement in response to the trigger.

In yet another embodiment, the invention provides a method for adding enhancing content in a readable medium, the method comprising: recognizing, with a sensor, an audible trigger associated with the readable medium; and communicating an extra-textual effect in response to the trigger.

In certain embodiment, the invention provides a method for enhancing an experience of piecing together a puzzle having a pattern, wherein the method comprises: recognizing, with a sensor, a surface pattern on a puzzle piece; determining a correspondence between the surface pattern on the puzzle piece with a portion of the surface pattern of the puzzle to form an identification; and providing a feedback associated with an accurate location for placing the puzzle piece within the puzzle according to the identification.

In certain embodiments, the systems and apparatus described herein are used in the methods described herein. Accordingly and in another embodiment, provided herein is a method for adding enhancing content in a readable medium, the method comprising: recognizing, with a sensor, an audible trigger associated with the readable medium; and communicating an extra-textual effect in response to the trigger, wherein the step of recognizing a audible trigger is preceded by the step of providing a system for readable media reading enhancement, the system comprising: a portable reading enhancement system operably connected to the readable medium, said portable reading enhancement system comprising a housing, a processor, a sensor, and a plurality of acoustic transducers, said portable reading enhancement system configured to: sense an audible trigger associated with the readable medium; sense a current page position in the readable medium; storing a recording of a user reading the readable medium utilizing an input transducer of said plurality of transducers and an acoustic enhancement corresponding to said current page position; and playing back said recording and said acoustic enhancement utilizing an output transducer of said plurality of transducers, wherein the recording playback is triggered by the audible trigger.

In some embodiments, the sensor used in the systems and methods described herein comprises an imager. In some embodiments, said sensor is configured to contact said book. In some embodiments, said sensor comprises a page turn counter. In some embodiments, said sensor generates a signal indicative of an absolute page position. In some embodiments, said sensor comprises an imager and circuitry for processing an image from said imager without recognizing any symbol in the page. In some embodiments, said circuitry generates a signature by processing a section of said image into a hash value. In some embodiments, the apparatus comprises a voice recoding circuit.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well. In important embodiments of the invention, equipment implementing the invention has high portability, low weight, low cost, long battery life.

BRIEF DESCRIPTION OF SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

FIG. 5 schematically illustrates a configuration of a book enhancement appliance as a standalone unit, according to exemplary embodiments of the invention.

FIG. 6A schematically illustrates a disposition of a book enhancement appliance based on a standard device, according to exemplary embodiments of the invention.

FIG. 6B schematically illustrates a disposition of a book enhancement appliance based on a smart phone, according to exemplary embodiments of the invention.

FIG. 7A schematically illustrates an outline of operations in reading (recording) pages of a book, according to exemplary embodiments of the invention.

FIG. 8D schematically illustrates operations in readout (playing) of a book with an edge viewing appliance, according to exemplary embodiments of the invention.

Figure 1A:
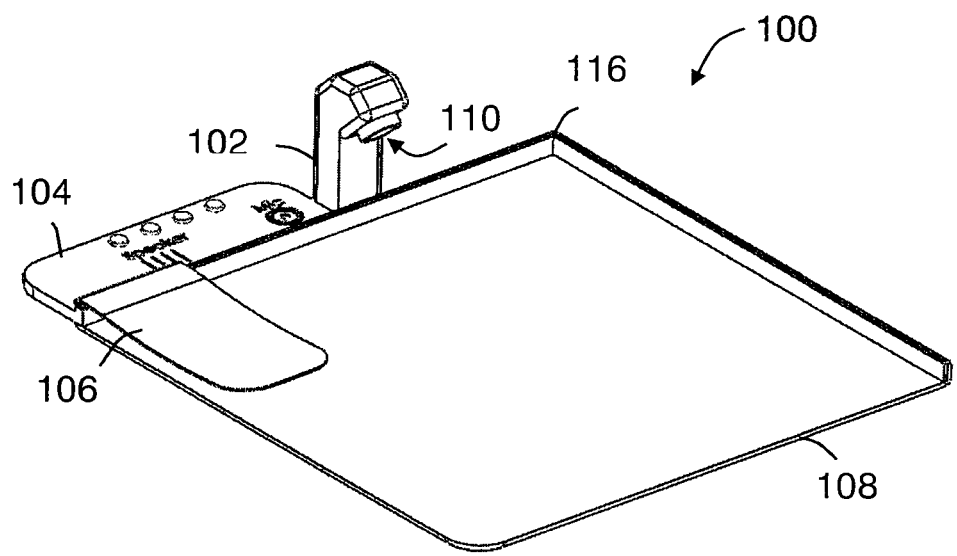
FIG. 1A schematically illustrates book enhancement appliance for top viewing, in accordance with exemplary embodiments of the invention.

Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described, and may be referred to throughout the following descriptions.

DETAILED DESCRIPTION OF THE INVENTION

The present invention, in some embodiments thereof, relates to audio and/or visual enhancement of readable media and, more particularly, but not exclusively, to book readout.

A general aspect of some embodiments of the present invention relates to enhancing readable media audibly or visually or audio-visually with respect to contents therein responsive to presentation of individual pages. In an exemplary embodiment of the invention, a book or pages thereof are autonomous or self sufficient, substantially devoid of any enhancement and/or marking by any additional element or technique. In certain embodiments, the pages are recognized by a signature of all or part of a page and do not require OCR, or other processing intensive methods that recognize specific symbols (e.g. ICR) or methods which require adaptation of a page identifying mechanism to different locations in different books, or methods which require analyzing a page to identify a page number portion thereof. In certain embodiments, a same location in a book is used for page identification substantially independently of the book design and page layout and/or independently of a page number location in a page and/or absence thereof. In one embodiment, no gesture or any other pointing trigger is necessary to initiate any of the actions assumed by the systems or methods described herein.

In certain embodiments, the term "readable media" refers to any sign or pattern formed on the media sought to be enhanced, which can be read by a person at least under certain conditions (in particular under normal illumination with visible light; and/or under specific illumination; and/or after activating an electronic devices (screen, light source or the like, etc.) which may be at least partially represented by recordable digital data. This may involve in certain embodiments text (handwriting or printed characters); codes (ASCII, universal optoelectronically read codes such as barcodes, etc.); images or photographs, and the like. In yet another embodiment, the term "readable media" refers to all manner of machine and/or digitally readable indicia that contains information including but not limited to such readable media being read and decoded by all manner of optical scanning devices commonly known in the art.

In some embodiments of the invention, readable media such as books, and in particular, without limiting, children books, are enhanced by providing audible readout of contents of individual pages of a book and/or readout related to contents of individual pages. In some embodiments, the readable media is audibly and/or visually and/or audio-visually enhanced by providing sounds and/or presenting images related to and/or augmenting contents of individual pages and/or a plurality of pages. In some embodiments, the readable media may be augmented by the user (for example, a child working with a pencil on an exercise book), and such augmentation be a trigger for enhancing.

Some embodiments of the invention particularly relate to unaided and/or unenhanced self sufficient readable media having no extraneous apparatus nor part nor mechanism nor any other means or aid. For example, books as are off-the-shelf without any additional mark or tag or any additional book or page identification.

In certain embodiments, the apparatus, device or systems described herein and which are used in the methods described herein, is used for book readout (e.g. playback of recording) and is mobile and operably and reversibly connected to the book in question. In some embodiments, the apparatus is disposed or mounted on a fixture attached to or separated from the book. It is a particular feature of some embodiments of the invention that use is made of standardization of books by printing so that a recoding made on one book in one geographical location can be used with a different book similarly printed, at a different geographical location.

As used herein the term 'book' denotes a conventional book, without precluding other readable media such as booklets, or leaflets or brochures either bound or not bound, or other articles such as picture puzzle. In one embodiment, book refers to electronic book devices such as KINDLE™, iPAD™ and the like.

Accordingly and in one embodiment, provided herein is a method for adding enhancing content to a readable medium, the method comprising: recognizing, with a sensor, a visual trigger associated with the readable medium; and communicating an enhancement in response to the trigger.

A general aspect of some embodiments of the present invention relates to enhancing and interacting with real-world objects (e.g., readable material, board games, etc.) audibly or visually or audio-visually with respect to contents therein responsive to presentation of individual objects or parts (book pages, jigsaw puzzle parts, etc.). In certain embodiments, the book and pages are un enhanced and unmarked with respect to the book such as generally available in bookstores. In certain embodiments, the pages are recognized by a signature of the entire page or part thereof. In some exemplary embodiments of the invention the recognition does not require OCR, or other processing intensive methods such that recognize specific symbols (e.g. ICR), or methods which require adaptation of a page identifying mechanism to different locations in different books, or methods which require analyzing a page to identify a page number portion thereof. In certain embodiments, a same location in a book is used for page identification substantially independently of the book design and page layout and/or independently of a page number location.

In certain embodiments, parts of a jigsaw puzzle are recognized by their shape and content, and their location in hinted to a person. In some embodiments of an invention, enhancement and interaction is importantly enabled by low-cost low-power stand-alone electronic devices. In some embodiments, said sensor comprises a page counting sensor. In one embodiment, provided herein is a method for enhancing an experience of piecing together a puzzle having a pattern, wherein the method comprises: recognizing, with a sensor, a surface pattern on a puzzle piece; determining a correspondence between the surface pattern on the puzzle piece with a portion of the surface pattern of the puzzle to form an identification; and providing a hint to identify an accurate location for placing the puzzle piece within the puzzle according to the identification.

In one embodiment, provided herein is a system and method for enhancing the experience of playing jigsaw puzzles and board games using a novel visual-recognition technology. In certain embodiment, the puzzle is a jigsaw puzzle that is defined by circumferential shape and pattern. In one embodiment, the puzzle piece is inserted into the "microscope-like" device and a feedback is communicated via an audio/projector/screen. That feedback could, for example, be in certain embodiments, "this is lion's eye"; "this is lion's ear"; "this is somewhere in the cloud". In other embodiments, the area where the piece should be placed is shown on computer screen or a projector. According to the "feedback level" the location for the proper place for the puzzle piece will in certain embodiments be shown more or less precisely. In yet other embodiments, feedback may provide tasks, which are checked by the device. E.g. and in other embodiments; "please find the lion's eye . . . great! Now find his ear no—this is a cloud, now find the sun . . . " and other similar tasks and commands.

In another embodiment, the device/system and/or apparatus described herein and used in the methods provided captures the entire board area and is capable of communicating to the user feedback or commands according to the user moves, decisions, etc.

In one embodiment, provided herein is a method for enhancing an experience of piecing together a puzzle having a pattern, wherein the method comprises: recognizing, with a sensor, a surface pattern on a puzzle piece; determining a correspondence between the surface pattern on the puzzle piece with a portion of the surface pattern of the puzzle to form an identification; and providing a feedback, such as audio feedback, a visual feedback or a combination thereof in other discrete embodiments to identify an accurate location for placing the puzzle piece within the puzzle according to the identification, wherein the audio feedback recites a nature of the pattern. In one embodiment, the nature of the surface pattern comprises at least one of an animal, or a plant, a building, a vehicle, a celestial body, an anatomical part, or a landscape part or their combination in other discrete embodiments.

In one embodiment, the visual feedback is displayed by at least one of a projector or a display screen and in yet another embodiment provides a degree of accuracy for the accurate location according to a feedbacking level wherein a higher feedback level results in a higher degree accuracy for the accurate location.

In one embodiment, the method for enhancing an experience of piecing together a puzzle having a pattern further comprising recognizing a current location of the puzzle piece and in another embodiment, communicating feedback according to a correspondence between the current location of the puzzle piece and the accurate location of the puzzle piece. In one embodiment, the method for enhancing the solving of the puzzle further comprising communicating positive feedback if the current location of the puzzle piece corresponds to the accurate location of the puzzle piece; and subsequently communicating a task to be performed in order to solve the puzzle. In one embodiment, the puzzle is a tiling puzzle, a jigsaw puzzle, or a combination thereof. In certain embodiment, the puzzle is a specific spatial arrangement of specific objects. In certain embodiment, a puzzle piece is defined by a three dimensional character. In one embodiment, the sensors described herein are used in the method for enhancing an experience of piecing together a puzzle having a pattern.

In one embodiment, the term "puzzle" refers to an interlocking configuration in which a protruding portion of one part fits within and is held in place by a recessed part of an adjoining part. In another embodiment, the term "puzzle" refers to a task of organizing a plurality of objects in a predetermined spatial and/or temporal configuration. In another embodiment, the term "surface pattern" refers to the surface contour of a three dimensional object or in one embodiment, the printed pattern. In some embodiments surface pattern refers to the tribology of a given object capable of being recognized by the systems, devices, appliances and apparatus used in the methods described herein.

In some embodiments, the memory used in the device/apparatus and systems described herein and used in the methods provided has stored thereon a plurality of acoustic enhancements, each associated with a given page position. In some embodiments, said memory has stored thereon a plurality of sets of acoustic enhancements, each set associated with a different identification trigger associated with the readable media. In one embodiment, the systems used herein are operably connected to the internet, such that the memory does not reside in the housing operably connected to the readable media and further contains a library of user defined enhancements.

In some embodiments, the apparatus comprises a display. In some embodiments, the apparatus comprises a display circuit configured to display an image or series of images on said display in response to said page identification and/or trigger. In some embodiments, said housing is adapted for housing on the top-center of a book's back cover. In some embodiments, said housing is adapted for housing on a book's central spine. In some embodiments, said housing is adapted for housing on a corner of a book cover. In some embodiments, said housing location is any location which will enables the proper functioning of the system/apparatus/device/appliance in the methods described herein. In some embodiments, the apparatus comprises circuitry adapted for sounding said enhancement according to a programmed script.

In some embodiments, the apparatus comprises circuitry adapted for sounding said enhancement responsive to a position of a finger on said book. In some embodiments, the apparatus comprises circuitry adapted for assembling a plurality of enhancements and associating said assembly with a page position.

According to an aspect of some embodiments of the present invention there is provided a method of enhancing a reading experience, comprising: selecting an un-enhanced book; housing a page identifier on said book; identifying an un enhanced page by said identifier and not through symbol identification; and generating an audio signal in response to said identifying.

In some embodiments, the method also generating non-audio media output in response to said identifying. In some embodiments, identifying comprises identifying by imaging. In some embodiments, identifying comprises identifying while moving said book. In some embodiments, identifying comprises identifying a page turning event. In some embodiments, identifying comprises identifying an absolute page position. In some embodiments, identifying comprises identifying a location within a page. In some embodiments, said generating is responsive to said location within a page.

In some embodiments, the method comprises generating a representation of said signal at a remote location and transmitting said representation to said identifier. In some embodiments, generating a representation comprises assembling a representation from a plurality of audio representations. In some embodiments, generating an audio signal comprises modifying a stored representation. In some embodiments, generating an audio signal comprises retrieving a representation from local storage responsive to said identifying.

In some embodiments, the method comprises: previously housing a page identifier on a book equivalent to said book; identifying an un enhanced page by said identifier; recording an audio signal in response to said identifying; and using said recorded signal for said generating.

In some embodiments, said identifying an un enhanced page comprises measuring thickness of pages at one side of said book, when said book is open to said un enhanced page. In some embodiments, generating an audio signal further comprises detecting a word or a phrase in the signal. In some embodiments, at least one of another audio signal or a visual signal is generated responsive to the detection.

Yet, in some embodiments, as specified or evident from the context, readable media is referred to. Optionally, a book has a hard cover to which a housing and/or page sensor are attached.

As used herein, and unless otherwise specified, the term 'page' relates to a pair of odd/even pages (when relevant) and to a book's front and/or back cover (when relevant).

As used herein, the term 'readout' denotes reproducing or producing or playing audibly contents of a book and/or related contents, such as by replaying a recorded loud reading.

It is noted that the following descriptions and discussions, unless otherwise specified, relate to unaided books. A general non-limiting overview of practicing the invention is presented below. The overview outlines exemplary practice of some embodiments of the invention, including serving as a basis for variations and/or alternative embodiments, some of which are described below.

A general non-limiting scenario is a person opening and leafing through a book and, by employing apparatus and methods as described herein, readout or other media annotation of the currently open page is automatically activated, without the necessity of a gesture, pointing or other external user generated trigger (e.g. stylus pen).

In some embodiments, a contactless (or contact) sensor senses the book or part thereof (e.g. at least one word or illustration) and identifies (recognizes) the page currently open based on deriving a unique code or signature of the page (identification). In certain embodiments, the sensor is fixed in place relative to the book, but is lightweight and/or small enough to not impact the book portability and usability. In some embodiments, portability implies that a typical three years old child can hold the sensor or an appliance comprising the sensor with no undue difficulty.

Optionally the sensor senses and/or identifies a page responsive to detection of a page turn (leafing), such as sensing a change between periodic sensing. In some embodiments, page turning is detected by another sensor and/or device.

In some embodiments, a sensor identifies the current page based on a thickness or other measurement of turned or unturned pages.

In certain embodiments, the page identification is used to retrieve a preset sound sequence (or stream or track or other media) associated with and/or related to the identified page and an acoustic transducer emits (plays, sounds) the located sequence. Optionally, a plurality of associated or related sequences is located and consecutively and/or concurrently played. Optionally playback is according to a preset of determined order and/or volume (or relative volumes therebetween), such as according to information (e.g. tags) and/or rules stored with the sequences and/or linked to and/or associated with the sequences.

In certain embodiments, provided herein is a method for adding enhancing content in a readable medium, the method comprising: recognizing, with a sensor, an audible trigger associated with the readable medium; and communicating an extra-textual effect in response to the trigger.

In one embodiment, provided herein is an automatic user-generated-audio-content enhancement. In one embodiment, the systems and methods described herein has comprise a memory wherein the text being recorded (e.g. story) is loaded ahead of time or is accessible through certain communication networks and automatically enhances it using a simple speech-recognition engine. All the "stories" in this service are pre-flagged in one embodiment, i.e. specific keywords are marked as audible triggers for sound effects (or other digital effects). In one embodiment, a user records themselves reading a story and get as a result a professional audio-book-like or radio-drama-like with sound effects and voice effects. In certain embodiments, a generic voice template is generated for each sound effect and the reader's voice is compared to the template to retrieve the sound effect.

In certain embodiments, the data for the annotation (e.g., audio) is stored on the reader device. Optionally, the data is retrieved form a local storage, such as a nearby computer or via a network, such as an internet, LAN, WAN and/or cell phone network.

In one example, at a preliminary stage, the pages of a book are read aloud (and/or described) and a sensor identifies the individual pages and the voice is stored (recorded) in association with the respective page identification. Subsequently, responsive to opening a page and identifying the page by a sensor, the respective reading track is located and played. A person of ordinary skill in the art would readily recognize that there are several voice-recognition devices and templates readily encompassed as facilitating of this technology.

In some embodiments, recording and/or reading is associated with a page location. For example, during recording, a user may point at a word or page location to be associated with a recording. During readout, a location on the page is identified, for example, by identifying a finger or a pointer, and the readout is selected according to the position. Optionally, the readout speed and/or duration is synchronized to the speed and/or position of such a pointer during readout.

In some embodiments, the pointer is a light spot, for example, from a LED or a laser pointer. In some embodiments, readout is accompanied by indication of the associated location, for example, by illuminating a portion of the page which is being read out, using a laser beam or using a LED. Optionally, the LED is masked (e.g., using a liquid crystal array) so that only a portion of the page is illuminated. In another embodiment, a motor or other actuator is used to aim the illumination such as with a mirror or a prism. In another embodiments, multiple illuminators are provided, one for each part of a page (e.g., 3, 6, 9 or intermediate or greater numbers), and the illuminator is selected according to a desired illumination. Optionally, each page location has a code associated therewith and the code of a page item is stored with association of the recorded voice, along as part of the page identification.

Additionally or alternatively, a preset sound sequence (e.g. recorded and/or synthesized and/or selected) is also associated or otherwise related with the page identification and/or with a page contents (or part thereof, e.g. a word or phrase or location). For example, if the page contents (or a pointed word) relate to wind then a sound track of wind is played, optionally concurrently or partially concurrently with the page recording or after a determined delay (e.g., silence). Such playing can be, for example, at a lower or otherwise determined volume relative to the recorded reading.

In some embodiments, the audio readout comprises or is linked with visual data such as images or animations or video (for brevity also referred to as 'image').

In some embodiments, the image is displayed on a screen comprised in a book enhancement appliance. Optionally or alternatively, a separate screen is used. Optionally or additionally, the image is projected on the book such as by an integrated and/or a separate projector.

In some embodiments, the image is displayed with synchronization with the currently opened page. In some embodiments, the image is displayed responsive to an event such as a page turn, pointing at a word, or other events such as, for example, sounding a word (see below).

In some embodiments, a projected image is synchronized and auto-calibrated to be projected on a specific word or area using "fine-tune-calibration" data the projector gets from the processor and sensor.

In certain embodiments, an editing tool is provided, for example, on a web server. The user may upload recordings or define or update scripts that act or operate on the sound or image data or the activation order thereof. A script can include, for example, playback, sound effects, visual effects and/or illumination effects. In some embodiments, the sound effect comprises, for example, reverb, echo, pitch modification or additional sound as an introduction or fill-in or epilog to a page. In some embodiments, a visual effect comprises, for example, video related to the page, optionally as an introduction or fill-in or epilog for a page. In some embodiments a script is activated responsive to an event, for example, in response to a page turn or pointing at a location in a page or sounding a word or phrase.

In some embodiments, a sound track is sounded responsive to page turn. The page turn sound may vary, for example, according to contents of previous page or next one, according to contents of the book in general and/or according to a time profile of page turning of the instant page (e.g., fast/slow) or the pages in general.

In some embodiments, sound tracks are stored in the sensor/reader or coupled equipment. Optionally or alternatively, sound tracks are stored in a linked device. Optionally or alternatively, sound tracks are stored remotely (e.g. web site) and are preloaded or loaded on demand.

In some embodiments, a page identification or signature optionally comprises or is associated with a page number. In some embodiments, a page number is optionally obtained by OCR of the page number and/or by the thickness of pages (described below). In certain embodiments, however, the page identification is obtained by imaging a part of a page or the entire page and generating a signature using a mathematical formula which, optionally, does not require understanding the page structure or content. Some embodiments use a signature of the page structure or pattern of light and dark and/or color or shades of gray areas, to generate a signature.

In some embodiments, responsive to opening or presenting a page (e.g., as an act by a user e.g. without leafing through pages) a sensing of an open book or cover thereof is started.

It is emphasized that, in some embodiments of the invention, sensing and identifying a page is carried out on a book 'as is', without relying any extraneous element in or on the book (e.g. no identification tag or barcode attached to a page and/or cover).

As used herein, and unless otherwise specified or evident from the context, the term 'sensor' denotes one or more sensing elements with coupled equipment configured to perform the sensing and/or process sensed data. For example, image sensing element (e.g. CMOS) coupled with electronic circuitry and/or processors and/or storage devices.

In some embodiments, the sensor operates responsive to electromagnetic radiation (e.g. visible, IR, UV or shortwave such as radar). Optionally or alternatively, the sensor operates responsive to other emissions such as ultrasound.

In some embodiments, the sensor is passive in the sense that it uses ambient light for imaging, for example, visible spectrum. Optionally or alternatively, the sensor is active in the sense that radiation (energy) is transmitted from the sensor, for example, IR or UV or laser scanning or shortwave or ultrasound.

In certain embodiments, one or more download servers are provided to support exchange of data between devices and/or to allow a user to download a recording or media items for annotation. In certain embodiments, a reader device is programmed with one or more book. Optionally, book identification is used only to distinguish between the books the reader is programmed for. Alternatively, book identification uses a remote server to identify many books and optionally download enhancement for them, if needed.

In some embodiments, the sensor is a camera that views all or part of a page and captures an image of the page or part thereof, such as about 10%, 20%, 30%, 40%, 50%, 60%, 70%, 80% or 90% of the page contents or area). The captured image is analyzed and/or processed to generate a page signature which is substantially unique relative to other pages of the same or other book. In some embodiments, the signature is unique relative to other pages of the same book. In some embodiments, the signature is unique relative to other pages of other books. Optionally, the signature is unique to other books in a reliability of about 90% or higher such as 95%.

Optionally, the processing compensates for the viewing angle and/or for attachment location to the book. For example, in some embodiments, the processing compensates for viewing angle in a range of about ±15° and/or positional deviation of about ±10 mm.

In certain embodiments, the processing is used to identify a one or unique layout and/or structure of the page, (e.g. relationship between blank and non-blank regions and/or number and/or widths of non-blank crossings of a virtual determined line and/or a frequency spectra (e.g., Fourier) and/or other types of spectra (e.g., wavelet) or transform results and/or combinations thereof.

In certain embodiments, a signature (e.g. identification) of the page is derived as a numeric value or values of such processing, e.g. as a code of the page. In some embodiments, deriving a signature based on a plurality of measures minifies or practically nullifies the probability of a conflict in identifications of pages. In some embodiments, the camera captures (acquires) the image by beam scanning such as laser scanning. Optionally, a combination of image sensor and beam scanning is used such as to increase the reliability of signature derivation relative to one mode of operation.

In some embodiments, the camera operates in the visible spectrum and/or in the IR and/or UV spectrum or a combination thereof. Optionally, the camera operates (e.g. by filters) at certain bandwidth of a spectrum for enhancing or reducing detrimental effects in the derivation of a signature.

Optionally, a non-visible illumination is used, to avoid interfering with a reading experience. Optionally, a visible illumination is used (e.g. LED lamps) such as to assist the reader and/or the camera while using the appliance in low-light conditions. Such illuminations (visible or non-visible) may be also used in order to detect page borders and in some embodiments enables to cut-out from the analyzed image an external-to-the-page "noise" (e.g. table, legs). For example, the detection is carried out by using image processing which examines reflection differences between the page contents and backgrounds (e.g. margins, table) or by implementing line detection techniques such as a Hough transform.

In some embodiments, the camera operates continuously and as a view changes and stabilizes (e.g. for at least a second) a page turn event is determined. Optionally or alternatively, for example, to save power, the camera operates periodically to determine a page turn. Optionally or alternatively, for example to reduce power consumption, once a page is viewed the camera views (and/or scan) a small portion of the page to determine a page turn.

Optionally or alternatively, the camera is mounted separately from the book. Optionally or alternatively, the camera is mounted on a structure generally above the book such as in a reading lamp. Optionally or alternatively, the camera is mounted on the person holding the book (or another person) such as on the forehead or shirt. In some embodiments, the camera is mounted or hidden in a doll (e.g. a teddy bear) and a sound transducer (e.g. loudspeaker) is installed there too, simulating reading by the doll or interacting therewith.

In some embodiments, a camera views the edge (thickness) of a book, capturing an image of the stack of pages. In certain embodiments, the book and/or currently open page are identified, at least to some reliability degree, for example, based on the thickness of the pages stack, and/or based on the pattern thereof. Optionally, a unique signature is derived from such an image, for example, as described above. Optionally, the book has a pattern printed on the edges of the pages visible from the edge (thickness view), and, optionally, the pattern is used to determine the currently open page and/or signature of a page.

In some embodiments, the book identification is provided or obtained otherwise (e.g. inputted the ISDN or by barcode scanned of the cover or by transmitting an image or signature of an image of the book to a server which matches the image or signature with a book cover). Optionally, the book identification is used as an input to the page counting, for example, providing parameters such as page thickness.

In some embodiments, signatures (or images) derived from a page view and an edge view are combined to provide identification in either viewing aspects and/or a combined viewing aspect (page and/or edge view). In some embodiments, as the edge view changes a page turn event is deduced. In some embodiments, the edge view camera operates as described above for page viewing and is provided in addition to or instead of such camera.

In some embodiments, counting the number of pages is based on the inference of the depth variations along the stack of pages using the structured light. For example, a lighting pattern such as stripes is projected on the stack of pages, for example perpendicularly or at another angle to the stack. According to the variations of the light structure distances or thicknesses may be deduced (e.g. relative to pattern expected from projecting on a plane). In some cases, deeper depths are present in between the pages, so that counting local depth minima may be used for estimating the number pages in a stack or pages. Optionally or alternatively, a moiré pattern is detected and analyzed.

In some embodiments, an electromechanical or accelerometer-based apparatus is used to determine (identify) the currently open page by gauging the thickness of a stack of pages. In some embodiments, a page turn is detected as the thickness changes and/or the page turning motion moves a member of the apparatus or a member is moved to allow a page turn. In other embodiments, an absolute thickness is measured.

In some embodiments, the book is identified, at least to some reliability degree, based on the thickness of the book or particular part thereof, and the currently open page is coded according to the thickness of the stack or pages.

In some embodiments, the book identification is provided or obtained otherwise, for example, as described above.

In some embodiments, a turn trigger may comprise a page turn event is identified by the sensor, such as sensing a change between periodic sensing. For example, a camera continuously or periodically (e.g. every 0.1 or 0.5 or 1 or 3 seconds) views the page, and when the view has changed and stabilized (e.g. substantially identical for about 1-3 seconds) a page turn is determined.

Some examples for a page turn detection mechanisms are described below. Therefore, in some embodiments, in order to save power page turn is triggered by different methods and device and the camera (or other sensors) are activated after the page turn, optionally In some embodiments, enhancement is provided by a standalone appliance or unit (e.g. independent of other resources). In some embodiments, the stand alone appliance comprises a camera (e.g. sensor), processing unit coupled and/or linked with a program and/or electronic circuitry and an acoustic transducer and/or a linked acoustic transducer (e.g. speaker). In some embodiments, an appliance for audibly enhancing a book comprises a sensor as a camera, such as a CMOS camera mounted in housing and/or on a support. In some embodiments, the appliance comprises a control panel for activities such as setting and/or operating the appliance.

In some embodiments, the camera is connected or attached to the control panel and optionally or alternatively, the camera is remote from the control panel and linked thereto (e.g. by wire or wirelessly).

In some embodiments, the appliance comprises an attachment member for removably fastening the appliance to a book, such as a clip that slides over and clamps on a cover of a book. For example, at a corner of the cover or at the book's central spine (i.e. a part of the cover over the pages' edges) or the book's back cover in its center.

In some embodiments, the appliance comprises a base providing a seat for a book where, optionally, the attachment member is connected to the base.

FIG. 1A schematically illustrates book enhancement appliance 100 for top (overhead) viewing, in accordance with exemplary embodiments of the invention. Appliance 100 comprises and/or is constructed with the following components.

(a) a camera 110 mounted on a support 102; (b) an optional control panel 104; (c) a book attachment member such as an elastic and/or flexible clip 106; (d) an optional base 108 as seat for a book, where, optionally, base 108 is expandable and shrinkable (e.g. by sliding plates) to accommodate to a size of a book; (e) an optional corner adjuster 116 for assisting to dispose the appliance repetitively with respect to a book and/or page.

Figure 1B:
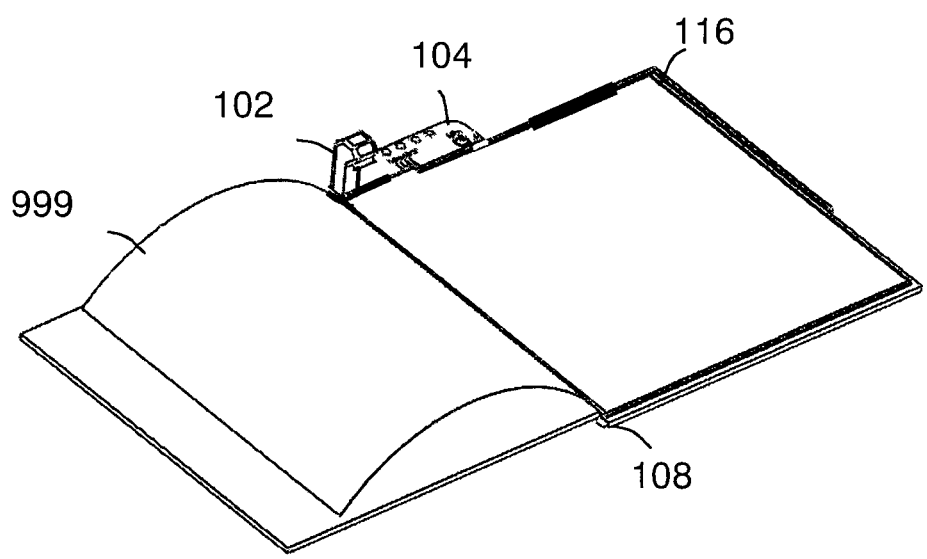
FIG. 1B schematically illustrates a general view of a book enhancement appliance for top viewing adjoined to a book, in accordance with exemplary embodiments of the invention.

FIG. 1B schematically illustrates a general view of a book enhancement appliance 100 for top (overhead) viewing adjoined to a book 999, in accordance with exemplary embodiments of the invention. Book 999 is seated on base 108 and the camera (not shown) is mounted on a camera support 102 providing a view over both odd and even pages, at least in part (e.g. by wide angle lens).

It is emphasized that viewing both pages is an example and in some embodiments each page is viewed separately, as described below. It is noted that base 108 and/or attachment member 106 are optional accessories, and in some embodiments appliance 100 comprises camera 110 and control panel 104 where camera 110 is mounted on support 102 or is otherwise disposed such as on another position relative to the book and/or remotely on a structure (e.g. a doll or lamp) or on a person.

In some embodiments, appliance 100 is formed as a structure comprising the camera, control panel and the attachment member. In some embodiments, the appliance is attached to the book in a particular location to allow consistent repetitive attachments, at least within an acceptable margin (so that the camera will include same portion of a page in a separate housings). For example, attaching the appliance at or near the separation of odd and even pages.

Figure 1C:
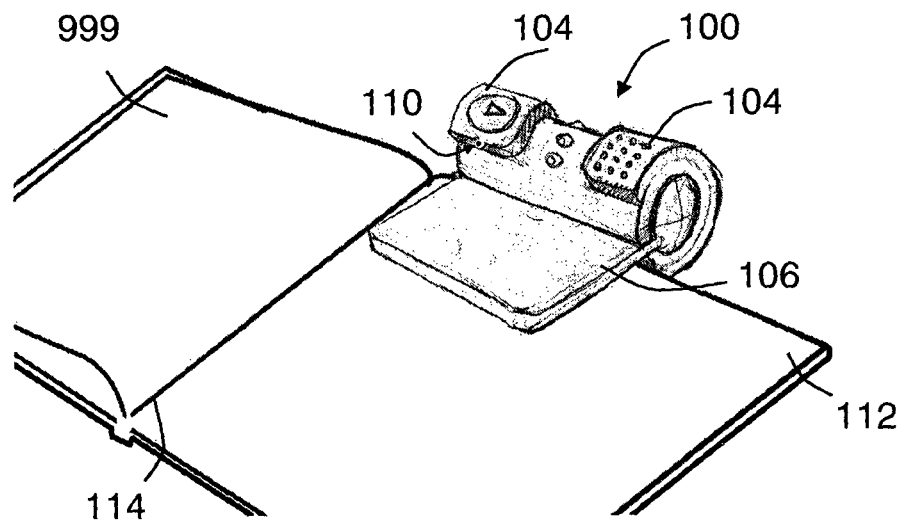
FIG. 1C schematically illustrates book enhancement appliance for top viewing attached to a book cover near the separation of the pages, in accordance with exemplary embodiments of the invention.
Figure 1D:
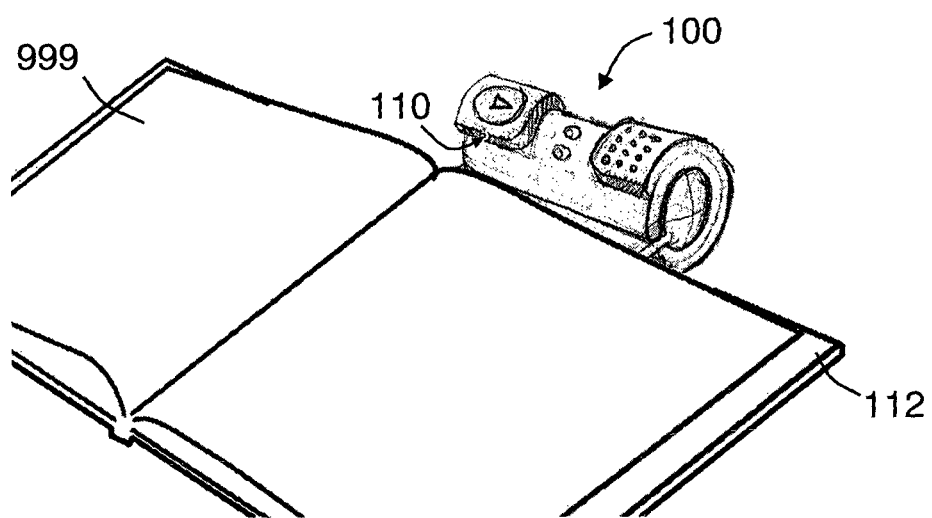
FIG. 1D schematically illustrates book enhancement appliance for top viewing attached to a book cover near the separation of the pages with pages turned, in accordance with exemplary embodiments of the invention.

FIG. 1C schematically illustrates book enhancement appliance 100 for top viewing attached to a book cover 112 near the separation 114 of the pages, in accordance with exemplary embodiments of the invention, and FIG. 1D schematically illustrates book enhancement appliance 100 for top viewing attached to a book cover 112 near the separation 114 of the pages with pages turned, in accordance with exemplary embodiments of the invention.

FIG. 1A-D illustrate a camera viewing generally over and above a book. The camera's viewpoint relative to the book or page may vary between embodiments of the book enhancement appliance, though for some specific embodiments the viewpoint is repetitive, at least for a certain extent, for repetition of captured images.

In some embodiments, the camera's viewpoint is generally vertical above the page, or in some embodiments the viewpoint is slanted towards the page, or in some embodiments the viewpoint is at the side of the book or page providing a shallow or superficial viewing over the page ('side' view).

FIG. 2A-D schematically illustrate various possible housing positions of camera 110 of a book enhancement appliance 100, in accordance with exemplary embodiments of the invention, where dotted arrows schematically indicate general viewing directions of camera 110 toward a book.

Figure 2A:
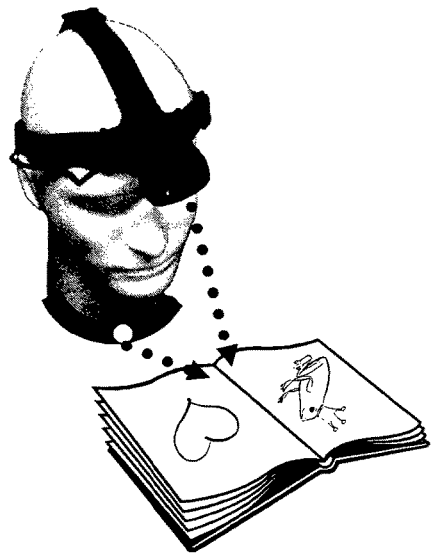
FIG. 2A-D schematically illustrate various possible housing positions of a camera of a book enhancement appliance, in accordance with exemplary embodiments of the invention.
Figure 2B:
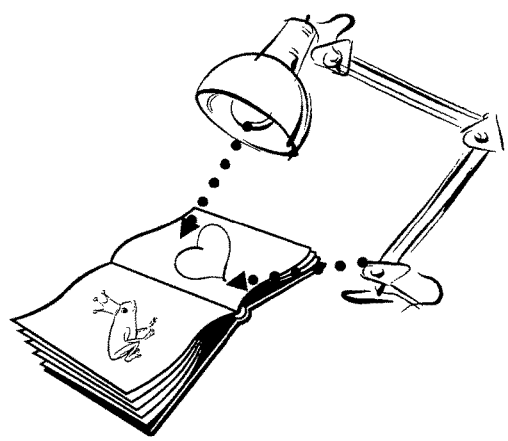
Figure 2C:
Figure 2D:
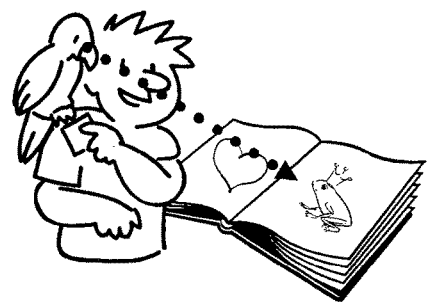

FIG. 2A illustrates two possible positions on a person, FIG. 2B illustrates positions for top and side viewing on a lamp, FIG. 2C illustrates positions for top and side viewing on a doll (e.g. teddy bear) and FIG. 2D illustrates a camera mounted on a doll held by a person (e.g., a child).

In some embodiments, a camera views both the left and right pages, optionally discrimination therebetween by determining the border (seam) dividing the pages by image processing (e.g. utilizing a Hough transform to find a consistent line between two blank margins). In some embodiments, a camera has alternating views of each page such has having dual sensing elements with dual lenses or split lens or by using a single sensing element and employing, for example, a synchronized rotating or vibrating mirror. In some embodiments when laser scanning is used beam steering may be employed.

In some embodiments, two cameras are used, one viewing the odd page and the other the even page. Optionally, more than two cameras are used to cover multiple regions in a page.

In some embodiments, an additional camera is dedicated or used for capturing an image or video of user of the appliance (e.g. child in readout or parent in reading (recording)). In some embodiments, the captured image or video is associated or otherwise synchronized with the recording and/or readout. For example, the images are stored in association with page signatures, as or similar to as the sound tracks are associated with a page signature.

In some embodiments, the camera is also used for "fine-tune-calibrating" of an image of any other projecting-stream being projected by a projector to a specific point or character or word or area over the book. In some embodiments, the camera or an additional camera is also capturing the user's gestures (e.g. hand gestures or face gestures) as for using same gestures later on in correlation of the readable media—i.e. "user-generated-gesture-enhancement". In one embodiment, camera or a $2^{nd}$ camera is capturing the user's gestures in relation to the story's text. In another embodiment, while a first user is reading the story, when pointing to a place in the page ("this is a tree")—the system used in the methods described herein, saves this data. When a subsequent user points to the same place—the feedback in the first user voice (saying: "this is a tree") will be played back.

In one embodiment an embedded visual-recognition appliance is used in order to precisely calibrate the projection to an exact location on the readable media and associated therewith (e.g. a word or a letter).

Figure 3A:
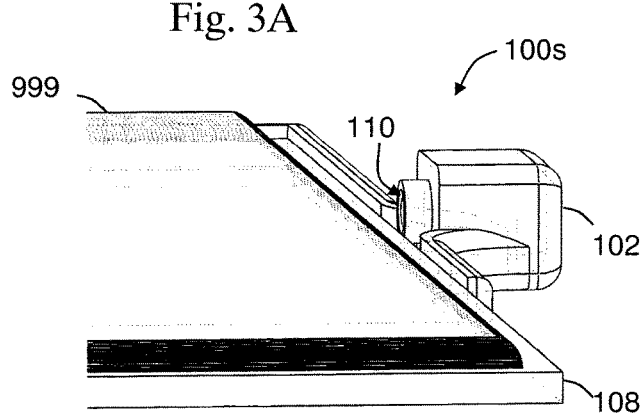
FIG. 3A schematically illustrates book enhancement appliance for edge viewing, in accordance with exemplary embodiments of the invention.

FIG. 3A schematically illustrates a variant book enhancement appliance 100s for edge viewing, in accordance with exemplary embodiments of the invention. Camera 110 is mounted on support 102 somewhat or to some extend elevated over the page, allowing a view of the odd and even pages from the side of a book such as with a lens of suitable or sufficient depth of field. For example, a lens with a depth of field of 10 mm and angle of view of 90° (e.g. 'macro lens').

Figure 3B:
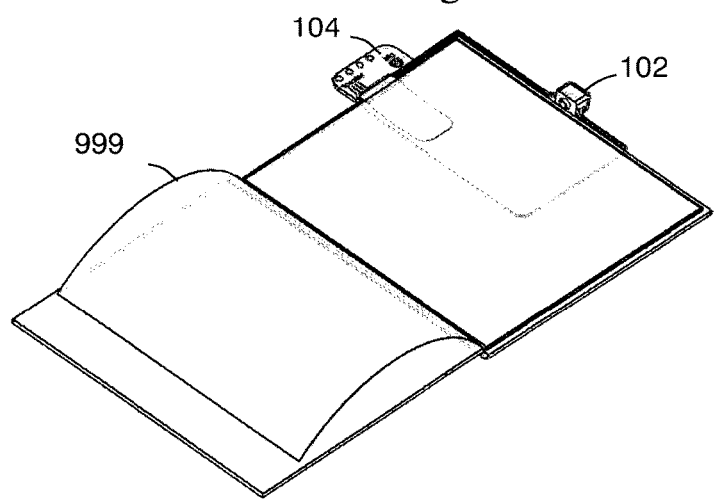
FIG. 3B schematically illustrates a general view of a book enhancement appliance for edge viewing adjoined to a book, in accordance with exemplary embodiments of the invention.

FIG. 3B schematically illustrates a general view of a book enhancement appliance for edge viewing adjoined to book 999, in accordance with exemplary embodiments of the invention. It is noted that, according to some embodiments, support 102 is not adjacent to control panel 104 as exemplified with support 102 at one side of book 999 and control panel 104 at another side. Support 102 and panel 104 maybe connected, for example, by a rigid or flexible connector or using wireless means.

Figure 3C:
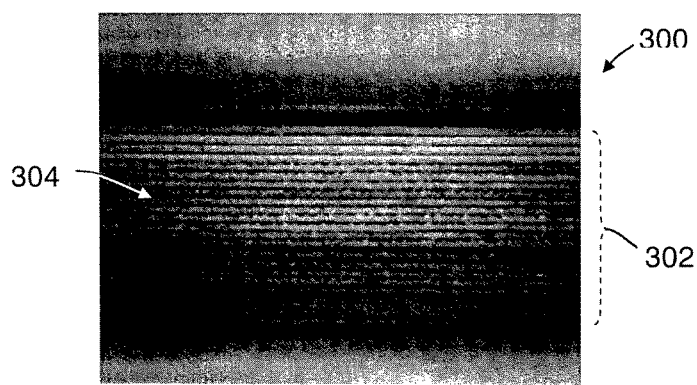
FIG. 3C illustrates an image obtained by a camera of a book enhancement appliance for edge viewing, in accordance with exemplary embodiments of the invention.

FIG. 3C illustrates an image 300 obtained by a camera of a book enhancement appliance for edge viewing, in accordance with exemplary embodiments of the invention. Image 300 exhibits a pattern 304 of the stack of pages 302 indicated using a dashed bracket.

In some embodiments, the camera takes periodic snapshots of the edge view and analyses the image received by trying to detect black-white pixel delta and identifying pages and delimiters between pages. The analysis counts the number of the pages and identifies the currently open page and/or a page turning.

In some embodiments, an electromechanical appliance is used to measure the thickness of the stack of pages to derive the currently open page. Optionally or alternatively, the electromechanical appliance is used for detecting or activating a page turning event. Such a page turn mechanism may be used in addition to or instead of a camera.

Figure 4A:
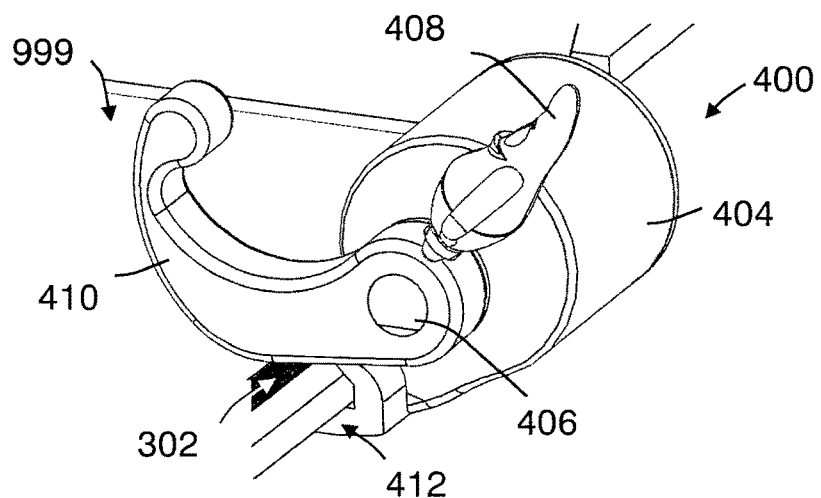
FIG. 4A schematically illustrates an electromechanical book enhancement appliance, in accordance with exemplary embodiments of the invention.

FIG. 4A schematically illustrates an electromechanical book enhancement appliance 400 gauging thickness of a stack of pages 302 of book 999, in accordance with exemplary embodiments of the invention.

Appliance 400 comprises a body 404 with an arm 410 mounted on a pivot 406, where arm 410 pivotally presses on a page of book 999 such as by an elastic element constructed in body 404 and/or pivot 406 or based on gravity. The angle and/or position of arm 410 relative to body 404 (or a regulating and/or calibrated element therein) indicates the thickness of stack 302. Optionally, this angle is measured using a force or tension measurement or based on position (e.g., using a calibrated potentiometer connected to pivot 406).

Figure 4B:
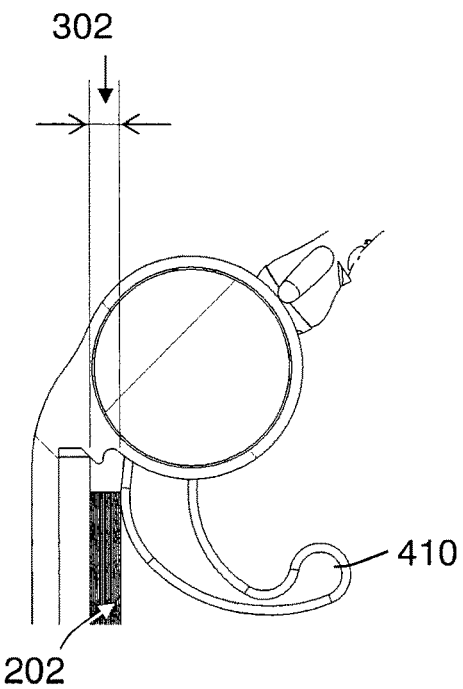
FIG. 4B schematically illustrates a cross-section view of an electromechanical book enhancement appliance gauging thickness of a stack of pages, in accordance with exemplary embodiments of the invention.

FIG. 4B schematically illustrates a cross-section view of electromechanical book enhancement appliance 400 gauging thickness of a stack of pages 302, in accordance with exemplary embodiments of the invention.

Figure 4C:
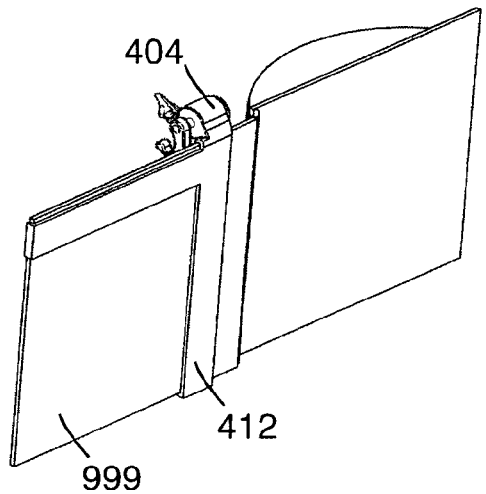
FIG. 4C-D schematically illustrate back and top views, respectively, of an electromechanical book enhancement appliance, in accordance with exemplary embodiments of the invention.
Figure 4D:
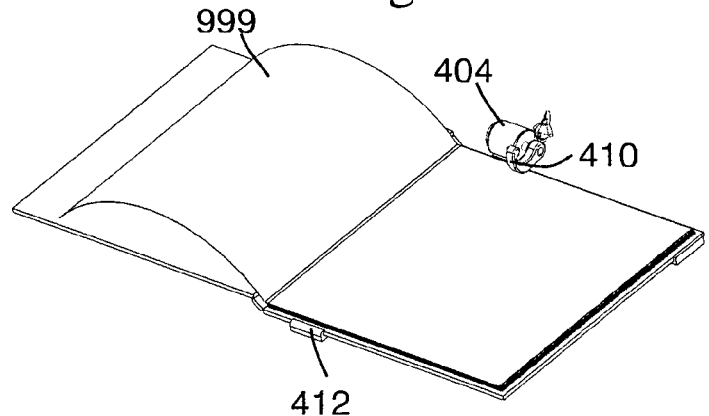

FIG. 4C-D schematically illustrate back and top views with respect to book 999, respectively, of electromechanical book enhancement appliance 400, in accordance with exemplary embodiments of the invention. Appliance 400 comprises a base 412 for seating book 999 with respect to arm 402.

In some embodiments, the electromechanical appliance comprises a lever coupled to the arm pressing on the pages, which lever raises the arm to allow turning of pages and, optionally, to trigger the detection of a page turning event.

Figure 4E:
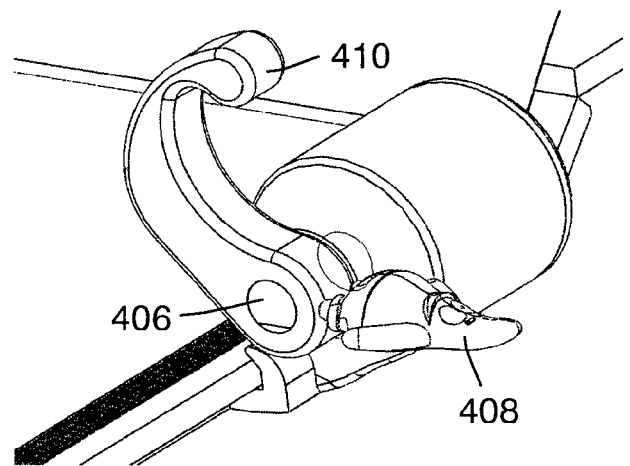
FIG. 4E schematically illustrates raising an arm of an electromechanical book enhancement appliance, in accordance with exemplary embodiments of the invention.

FIG. 4E schematically illustrates raising arm 410 of electromechanical book enhancement appliance 400 by lever 408 to allow page turning, thereby rotating pivot 406 to an extent larger than used or designed for pressing on a page, accordance with exemplary embodiments of the invention. As pivot 406 rotates to the larger extent, pivot 406 optionally effects triggering of a page turning event such as by a potentiometer or a switch or a photo sensitive detector that is shaded by an opaque element (e.g. micro-switch or a photo interrupter in pivot 406 or body 404).

In some embodiments, a book enhancement appliance uses other modailies or additional methods to deduce the currently open page (or number of pages) in a stack of pages. For example, a shortwave radiation or RF beam is transmitted towards the edge of a book and the reflected radiation is processed, for example using radar or laser ranging processing techniques of the art, to determine the currently open page according to the pattern and/or thickness of a stack or pages.

Optionally or alternatively, non-optical imaging, such as ultrasound imaging, is used. For example, sending a wave packet and deducing the page stack arrangement such as by echo detection or any ranging technique of the art (e.g. time to detection of a reflected echo).

In some embodiments a book enhancement appliance as a standalone unit or integrated unit (e.g. appliance 100) comprises: (a) a sensor (e.g. camera or laser scanner, optionally a plurality thereof); (b) a processor (optionally a plurality thereof, optionally comprising circuitries such as gate arrays or macro-cells, optionally as a system-on-chip (SOC), coupled with or wired an executable program code designed to perform book enhancement operations); (c) a memory (optionally comprised in a processor); (d) an output acoustic transducer (e.g. miniature loudspeaker, optionally comprising or operable as a microphone such as by piezoelectric element); (e) an input acoustic transducer (e.g. a microphone, optionally comprising or operable as a speaker such as by piezoelectric element); (f) a power source (e.g. a battery).

In some embodiments, the appliance is powered by the power source and controlled by the processor according to a program so it performs one or more of the following operations: (a) The sensor is activated and the output thereof is stored in the memory and processed by the processor according to a program to derive a signature of a page (optionally responsive to a page turning trigger, see below); (b) The input transducer is activated and the output thereof is stored as a sound track in association of the page signature (recording); (c) According to a page signature a sound track is accessed and the output transducer is activated to play (produce) the sound (readout). Optionally the sound track in storage and/or on the fly with the readout processes and modified (e.g. warped) to provide effects such as mimicking a child or an animal or other effect such as echoes.

In some embodiments a book enhancement appliance as a standalone unit (e.g. appliance 100) further comprises one or more of the following: (a) a user interface (e.g. buttons and indicators and/or touch screen); (b) an input port for power; (c) an output port for earphones and/or loudspeaker; (d) an input port for microphone; (e) an input port for event (e.g. page turning); (f) an input port for downloading external data such as sound tracks (e.g. tracks associated with a page signature) from an external source (e.g. personal computer or web site), optionally combined with output port (e.g. USB port); (g) an output port for uploading sound tracks (e.g. tracks associated with a page signature) to an external source (e.g. personal computer or web site), optionally combined with output port (e.g. USB port); (h) a socket or port for extending the memory (e.g. socket for SD cards); (i) a transmitter/receiver (e.g., Bluetooth), for receiving and/or transmitting data and/or an audio stream.

In some embodiments, the appliance comprises circuitry and/or the program is designed and coded to provide warping or modifying a sound according to preset settings such as, for example, "dog", "cat", "baby", "child" or other presets.

In some embodiments, the appliance comprises circuitry and/or the program is designed and coded to provide, responsive to a page turn event (e.g. trigger) a preset sound, optionally selectable from a plurality of sounds, or, optionally, a determined sound from a plurality of sounds. In some embodiments, a sound for a last page turn is provided. In some embodiments, the operations listed above are executed and/or controlled (or executable or controllable) by the processor according to a program.

In some embodiments a book enhancement appliance, such as a standalone unit (e.g. appliance 100), is constructed using commodity components such as of or used for webcams or cellular phones, or off the shelf SOC (e.g. such as or similar to Multimedia SOC used in appliances such as MP4 players) and/or other commodity electronic components, e.g. piezoelectric speaker or microphone.

In some embodiments a book enhancement appliance is a standalone unit (e.g. appliance 100) and does not include an input transducer and is optionally used as a readout unit only wherein the sound tracks are downloaded from an external source (e.g. website or web service such as or similar to iTunes (Apple. Inc.)).

FIG. 5 schematically illustrates a configuration of a book enhancement appliance 500 as a standalone unit, according to exemplary embodiments of the invention. A processor 502, coupled to memory 504 interacts with sensor 110 (e.g. camera), speaker (output transducer) 506 and microphone (input transducer) 508. A power source such as battery 510 provides power to appliance 500. Appliance 500 further comprises, optionally, a control panel 516 with controls for user interface 518. Optionally, user interface 518 is, at least partially, separated from control panel 516.

In some embodiments, user interface 518 provides indications such as interference to the camera (e.g. shades and/or blurred image), notification that the book and/or page is not identified, or charge level of a battery. In some embodiments, user interface 518 provides capabilities such as viewing the person reading the book (optionally via a linked screen), or forward/backward controls to adjust the readout with a page (in case of mismatch such as due to interference with the camera). In some embodiments, user interface 518 provides readout of a book and/or pages thereof without the book (and/or camera) such as for a story before sleeping.

Appliance 500 further comprises optional interfaces 514 for components or capabilities or means such as for a page turn detector or an interface for external memory or connections such as to a computer or web site or for external devices, one shown as a connection 514d for a display 512. The arrows indicate possible interactions between components and components drawn in dashed lines generally indicate optional components.

In some embodiments, book enhancement is implemented not a standalone unit but, rather, by using components not comprised or integrated in a single appliance or apparatus. In some embodiments, external resources or components are used, for example, external loudspeaker or microphone. In some embodiments, an external keyboard and/or screen is used for user interface instead or in addition to the control panel.

In some embodiments, a book enhancement appliance as a standalone unit or integrated unit further comprises image/video support such as a screen capable of displaying images or video or animation, for example, at a quality and/or size and/or resolution similar to that provided by MP4 players. For example, about 175 mm×220 mm×50 mm. In some embodiments, the screen is used also for user interface (e.g. being a touch screen). For example, such a screen can be used by a reader to select special effects to be played when reading back or to select an accompaniment (e.g., by the child).

In some embodiments, the appliance is configured to locate images and/or video clips (files) associated with a page signature and display it along with or sequentially to sound tracks. In some embodiments, the appliance further comprises a miniature camera to capture the user (or a reader of the book, e.g., during voice recording, either as still images and/or video clips and store the images and/or video clips in association with page signatures either locally or remotely (e.g. on another computer or web site).

Optionally or alternatively, a screen and/or a camera (e.g. sensor) can be used for interaction between users of the appliance. For example, the audio readout is accompanied by synchronized video of the reader (recorder) of the book captured such as by an integrated camera in the appliance or an external camera (e.g. web-cam, see also below). Optionally or additionally, the screen displays some related video or animation, optionally in a split screen or embedded window.

In some embodiments, a book enhancement appliance as a standalone unit or integrated unit further comprises other sensory support, such as components to enrich the readout of pages of a book. For example, a tactile component operated along readout such as by vibrations related to a page contents (e.g. for scratch sensation), or an olfactory device releasing fragrance according to a page contents or a video projector (e.g. kids' mini LED projector) projecting related images on the page. In some embodiments, output readable by a blind person is provided as part of the appliance or linked to the appliance, for example, a portable Braille display.

In some embodiments, standard or off-the-shelf products comprise a least some or all of the components of a book enhancement appliance as a standalone unit (e.g. as appliance 100), with optional modification, for example as described below, for example, by providing suitable software. In some embodiments, a computer (e.g. desktop or notebook computer) is used for book enhancement.

For example, the computer is loaded with a program designed coded to carry out operations of book enhancement. A camera attached or coupled with the computer is used to acquire view pages and the computer process the acquired data and derive signatures of the pages; or, for example, a speaker is attached to the computer and used to readout a soundtrack locally or remotely stored; or, for example, a microphone is attached and used in recording reading of pages; or, for example, the screen is used to display images or video clips; or, for example, the keyboard and/or screen of the computer is used for user in interface of book enhancement.

In some embodiments, a computer such a notebook computer comprises at least some of the components used in book enhancement (e.g. speaker or camera) and missing components are connected or present components are supplemented with external components (e.g. with external camera suitable for positioning to view the pages) and the computer is loaded with a program designed coded to carry out operations of book enhancement.

In some embodiments, portable devices comprise a least some or all of the components of a book enhancement appliance as a standalone unit. For example, some smart phones or some other handheld units such as a tablet computer, PDA, or small mini-notebooks or pads (hereinafter 'smart phone') comprise (e.g. as built in) a programmable processor, a camera, a loudspeaker a microphone and spare or auxiliary memory as well in some cases connection to external resources such a computers and web sites (e.g. using Bluetooth, WiFi, and/or 3/4G).

Thus, in some embodiments, a book enhancement appliance as a standalone unit (e.g. akin to appliance 100) may be implemented in and used with a smart phone, at least partially. In some embodiments, implementing a book enhancement appliance comprises programming the smart phone (e.g., by loading or otherwise adding) with a program configured to use resources of the smart phone for book enhancement. Optionally or additionally, the memory is loaded with soundtracks associated with signatures of book pages.

For example, a camera of the smart phone is used to view pages and the image is processed by a processor of the smart phone to derive a signature of the page; or, for example, the microphone of the smart phone is used in recording reading of pages and the processor stores the sounds on a memory of the smart phone; or, for example, the processor locates soundtracks associated with a page signature (either locally and/or remotely stored) and activates the speaker accordingly; or, for example, the keys and/or screen of the smart phone are used for user interface.

In certain embodiments, a fitting is used to mount the smart phone in a known configuration relative to the book. In some embodiments, a procedure and/or program (e.g. in a memory card) is provided to calibrate and/or adapt a smart phone for book enhancement.

FIG. 6A schematically illustrates a disposition of a book enhancement appliance based on a standard device 600, according to exemplary embodiments of the invention. Device is mounted on an optional support 602 for suitable viewing of a book 999 by sensor (camera) 110, the viewing thereof generally illustrated by dashed lines 604.

FIG. 6B schematically illustrates a disposition of a book enhancement appliance based on a smart phone 600b, according to exemplary embodiments of the invention. Smart phone 600b is mounted on an optional support 602 for suitable viewing of book 999 by a camera. In some embodiments, the smart phone's buttons and/or screen may function as a user interface such as user interface 606.

In some embodiments, when the smart phone (and/or another computer) does not comprise or include a required or optional component, an external component is coupled (e.g. by wire or wirelessly) using a program coded to support the connection and connected component. For example, tactile device or olfactory or stereo or surround speakers maybe connected using such a scheme. In some embodiments, a fixture is provided to hold the smart phone such that the camera thereof is suitably positioned to view pages of the book and/or a suitable mounted camera is connected instead of a built-in camera.

The term 'book enhancement appliance' is used herein, unless otherwise specified, for either a stand alone or integrated apparatus or apparatus with external devices or standard smart phone programmed and/or configured for book enhancement.

Some exemplary descriptions of utilizing book enhancement appliance are described or discussed below where a camera is used as a non-limiting example of a sensor or electromechanical appliance or a combination of sensors, unless otherwise specified.

Accordingly, without limiting, pages (and/or books) signatures (codes) and data storage are assumed to be standardized in a manner that sound tracks obtained with one device or appliance or apparatus are compatible with other devices or appliances.

For brevity, without limiting and unless otherwise specified, referring to sound tracks or files optionally comprise, when supported, also video or other modalities such as tactile and/or olfactory presentations.

For brevity, without limiting and unless otherwise specified, referring to reading a page implies, optionally, literal reading and/or description of contents of the page such as images and/or any account related to the page (and/or book) and/or pointing at the referred item image and/or video capturing, and vise versa, to readout or presentation of a page.

For brevity, without limiting and unless otherwise specified, referring to recording and readout implies, optionally, recording and presentation, respectively, of voice and/or image and/or video and/or pointer or pointed item. Additionally, without limiting and unless otherwise specified, referring to recording or readout can include storing the recording with association to a page signature and retrieving according a page signature, respectively.

Exemplary cameras and optics may comprise: Top view: Image resolution: 320×240 pixels; Pixel values: 8 bit grayscale; Height of camera over pages: 5 cm; Inclination angle of camera: 45 degrees; Camera's FOV: 60 degrees; Camera frame rate: 10 frames per second. Edge view: Image resolution: 1280×1024 pixels; Pixel values: 8 bit grayscale; Distance of camera from pages: 1 cm.

Exemplary portable device: Processing clock-rate: 64 MHz; RAM: 512 kB; Operating power: 3V (to be supplied from either 2 or 3 AA or AAA batteries or AC/DC transformer); Weight (without batteries): 100 gm.

Exemplary operation with signatures; Recording phase. When applicable, setup the appliance for reading (recording). For each page to be read: (a) Capture an image of the page or part thereof (or a pair of pages or a cover); (b) Apply a mathematical coding function on the image, producing a sequence of numbers related to the image as a signature (reference signature); (c) Record a reading of the page; (d) Stores the signature in association with the currently recorded audio signal. When applicable, setup the appliance for readout (playback).

For each page to be read: (a) Capture an image of the page or part thereof (or a pair of pages or a cover); (b) Apply a mathematical coding function on the image, producing a sequence of numbers related to the image as the signature (current signature); (c) Compare the current signature to reference signatures (such as stored in operation d of the recording phase). The comparison may be performed by evaluating a mathematical similarity function applied on pairs of signatures, the current signature and a reference signature. The similarity function may return a scalar that indicates the degree of similarity between the two signatures on which it was applied; (d) Readout (playback) the stored recording associated with a signature of highest degree of similarity.

In case the similarity function returns two close highest degree values with respect to two reference signatures an indication is generated to the effect that the page was not recognized. Close values implies, for example, a difference between 0% to about 20% with respect to the highest value.

For the coding function: (a) In case of a color image, convert the image to a grayscale format (the image); (b) Detect distinctive regions (features) in the image; (c) Obtain the locations (coordinates) and sizes (scales) of the detected features; (d) Obtain a descriptor for each feature, the descriptor comprising a unit vector of length 128 encapsulating statistics of intensity gradient orientations in the region corresponding to the feature; (e) Provide a set of the detected features along with their corresponding descriptors as a signature of the image.

For the similarity function: (a) Compare the location and size of each feature in one signature to the location and size of each feature in the second signature; If the two features are located within a predefined maximal distance from each other (e.g., 50 pixels) and the ratio between their scales is close enough to 1 (e.g., between 1/1.3 to 1.3), then the dissimilarity of this pair of features is set to be inverse cosine of the inner product of their descriptors. Otherwise, their dissimilarity is set to infinity (e.g. a special value representing infinity); (b) Check for a pair of features with the least dissimilarity; If the features' dissimilarity is less than a predefined threshold (e.g., 0.45 radians), then the two features are designated as being matched. Otherwise, skip to operation f below; (c) Check for pair of features that none of which is designated as being matched and of least dissimilarity out of all such pairs. If no such pair exists, skip to operation f below; (d) If the dissimilarity of feature pair found in operation c is less than the aforementioned predefined threshold (operation b), then the two features are designated as being matched. Otherwise, skip to operation f below; (e) Return to operation c; (f) Provide the similarity of the two signatures as a value in the range between 0 and 1.

The similarity is provided as $N3/(N1+N2)$, where $N1$ and $N2$ denote the number of features in the two signatures, and $N3$ denotes the total number of features that are designated as being matched.

In some embodiments, a data structure of a page signature is arranged such as [feature 1, feature 2 . . . feature N], where a feature is structured as =[x coordinate, y coordinate, size (radius), descriptor], where descriptor is a vector of 128 numbers.

In some embodiments, a pointer function may comprise a finger or a light spot or other objects such as a stick or pencil are used to point on words or illustrations or other elements of a page (pointer). In some embodiments, the pointer location is detected, optionally as a feature of the page, and the location thereof is stored along with the signature (e.g. associated with the signature). In some embodiments, the storage and retrieval of the pointer location is similar to that of sound recording and retrieval.

Exemplary basic scenarios: Same unit. In some embodiments, the same appliance such as appliance 100 is used for recording and readout.

A book enhancement appliance is setup, e.g. a book is suitably disposed for viewing by the camera and power is turned on and possibly some required setting are set (e.g. recording or camera brightness or contrast).

A person such as a parent or grandparent reads pages of the book or a plurality of books, optionally while pointing to the referred item. The reading is recorded and the appliance is given or sent to a child, optionally with the book or books.

Subsequently, the child, optionally assisted by an adult, sets-up the appliance with a book and as the child opens a page of the book readout of the currently open page is presented.

In some embodiments, the child (or assisted by an adult) selects a readout format or arrangement. For example, mimicking doll or cat or baby or other creatures or sources and/or setting the speed and/or pitch of readout or selecting accompanying audio and/or video tracks In some embodiments, a preset page turn sound is selected such that when a page is turn the sound is activated. For example, "Now let us see the next page", or, for example, some transient sound.

Separate units. In some embodiments, separate appliances such as appliance 100 are used for recording and readout, such as a grandparent and child each having an appliance.

A book enhancement appliance is set up, e.g. a book is disposed for viewing by the camera and power is turned on and possibly some required setting are set (e.g. selecting the book for readout, recording or camera brightness or contrast).

A person such as a parent or grandparent reads pages of the book or a plurality of books, optionally while pointing to the referred item. The reading is recorded and, optionally, the child is notified that books were read for him. The recording is sent to the child, for example, by e-mail.

Optionally, when a child connects his appliance to a computer, software on the device and/or computer checks for available readings and downloads them to the appliance. In some embodiments, when a child starts the appliance, and provided that the appliance is connected to the internet and/or server (see below), a synchronization of the appliance with the recording is activated (akin to phone contacts synchronization of files synchronization between two computers).

Subsequently, the child, optionally assisted by an adult, sets his appliance with a book and as the child opens a page of the book readout of the currently open page is presented. In some embodiments, the readout of a page is activated automatically or responsive to an event such as page turn or by a user interface control.

In some embodiments, pages are read in a plurality of languages or dialects for optional retrieval by audience of the respective language or dialect. In some embodiments, an appliance is provided with dual-language tracks such as for improving a child foreign language skill, e.g. by comparing readout in mother tongue with readout in a foreign language.

In some embodiments, pages are read, or supplemented, by machine reading (e.g. OCR and conversion to sound tracks, by text to speech). Optionally, such tracks are generated directly from a digital representation of the book or the contents of the book.

In some embodiments, sound tracks related to page (or book) contents are obtained, or prepared (e.g. recorded) or synthesized and associated with signature or signatures respective to the pages. For example, wind or airplane or car or train or other sounds related to pages or words therein or a book in general.

In some embodiments, sound effects such as page turn effects e.g. buzz or whiz sound or other effects such a background sound are obtained or prepared such as by synthesizing. The sound tracks prepared as above are stored in association of the respective pages (or books) signature for optional retrieval by a book enhancement appliance.

Subsequently, in some embodiments, a child, optionally assisted by an adult, mounts his appliance or housing in another embodiment on a book and connects to a site storing related sounds using a communication network. After selecting a book to be enhanced, sound tracks optionally comprising effects stored therein are selected and the tracks are downloaded to the appliance, optionally according to a selected or preset language (e.g. in the appliance automatically indicating the language). Optionally or alternatively, the appliance is stayed connected to the site and the tracks are accessed and retrieved 'on the fly'.

Subsequently, as the child opens a page of the book readout of the currently open page is presented accompanied with additional effects as selected such as a particular voice, or additional effects such as sounds related to the contents or pointed words or a page turn effect or introductory and ending tracks or background sound or music.

In some embodiments, the book itself is stored in a site, optionally with related sounds, for optional downloading. Thus, if a book is not available to the child, the book itself (or part thereof) is loaded from the site (e.g. in PDF format) and printed locally and the pages, optionally bounded or clipped, are placed with the book enhancement appliance and used as described.

In some embodiments, the soundtracks are obtained and/or updated on a media such as a memory card (e.g. SD) or USB drive, optionally with the respective printed book. For example, a package with the book and medium is sent to the child. In some embodiments, the sound tracks are obtained and/or updated via a wireless connection or any other connection such as via the internet.

In some embodiments, a relative of the child (e.g. parent or grandparent) can optionally read a book and obtain additional sound tracks from a site (e.g. effects) and send the tracks to the child, thus personalizing the readout and enhancing the child experience with effects. Optionally or alternatively, the relative loads the reading and effects into an appliance and sends the appliance, optionally with a book, to the child.

In some embodiments, a relative of the child (e.g. parent or grandparent) can optionally read a book and send soundtracks of the reading to a site storing related tracks (e.g. effects) to be optionally retrieved by the child.

In some embodiments, reading (recording) or readout of a word is used as a triggering event. In some embodiments, the word is detected and triggers an effect such as by cross-correlation of a word wave pattern with other sound patterns and/or dynamic time warping (DTW) that identify a word based on acoustic characteristics thereof. In some embodiments, speech alignment is used such as by hidden Markov model.

In some embodiments, a word or textual trigger; triggers an event that activates a sound and/or video effect such as introductory sound or video, or modifying the sound pitch or mimicking or another person or animal or any other effect, some of which are described above.

In some embodiments, the sound tracks are tagged and/or otherwise marked or arranged for preset and/or determined readout. For example, the order of sounding the tracks is indicated along with the tracks or in an accompanying data (e.g. file). Or as another example, a set of rules or instructions and conditions (plan) is designed and coded (e.g. as a script) and the tracks are arranged according to the plan. Optionally or alternatively, the plan accompanies the tracks and the appliance is configured to readout the tracks according to the plan or part thereof. For example, the program of the appliance is designed and coded for executing the plan by the processor, or additional program modules designed and coded for executing the plan is added to the appliance such as by a card or download or any other input method.

In some embodiments, an organization such as described above designs and codes and/or prepares a toolkit (e.g. a set of programs) for planning enabling a user (e.g. a child optionally assisted by an adult) to organize a sequence of reading and effects.

In some embodiments, the toolkit is stored on a site or downloaded to a local computer wherein the toolkit is used to plan readout. In some embodiments, the book enhancement appliance is configured by a plan program and, in some embodiments, the arrangement is prepared on the appliance based on local (e.g. recorded or previously obtained tracks) and/or downloaded tracks.

Exemplary social interactions. In some embodiments, the appliance such as appliance 100 encourages an interaction between a listener of a book such as a child and the reader such as a parent. For example, a prompt is generated by the appliance, such as by audio or visual message, encouraging an interaction. In some embodiments, the interaction is by sending a 'thank you' letter, email or multi-media message to the recording person. Optionally or additionally, the interaction comprises adding a 'thank you' sound track and/or video clip to a repository related to the book in a service (see below).

In some embodiments, a program for automatic or semi-automatic 'staging' sound tracks for enhancing a book is designed and coded and executed (or executable) to arrange and/or compile and/or order sound tracks for a book (hereinafter 'staging program' or 'staging'). In some embodiments, the staging is performed or conducted in an organization such as described above.

In some embodiments, the staging comprises sound tracks or tracks of a book reading which are obtained, for example, by recording a loud reading or obtained otherwise such as by OCR and speech generation or from another source (e.g. obtained from a story teller). In some embodiments, the sound tracks comprise effects such as described above.

In some embodiments, the sound tracks are processed such as by a speech recognition apparatus and individual words and/or phrases (terms) are recognized. The recognized terms are marked (flagged) with respect to the track and timing therein.

In some embodiments, a staging program is designed and coded based on flagged terms. In some embodiments, the staging program is similar to the plan described above yet with a resolution of individual terms (e.g. words and/or phrases) rather than a coarser resolution of tracks.

In some embodiments, sound tracks are arranged (e.g., manually or automatically) for readout where effects such as background sound (or music) or sounds related to terms or warping the reading sound are serialized (e.g. sequenced or concatenated or inserted in the reading). In some embodiments, the arrangement is prepared in separate file or files (or stream or streams) for optional subsequent download to an enhancement appliance. In some embodiments, the arrangement is prepared by tags or pointers or other methods so that upon downloading the serialized contents is downloadable.

In some embodiments, the arrangement is stored remotely in such as on a remote server or web site. Optionally or alternatively, the arrangement is stored on a local computer (e.g. after download).

In some embodiments, a book enhancement appliance is configured by a staging program and, in some embodiments, the arrangement is prepared on the appliance based on local (e.g. recorded or previously obtained tracks) and/or downloaded tracks.

In some embodiments, the toolkit is stored on a web site or downloaded to a local computer wherein the toolkit is used to stage readout. In some embodiments, the book enhancement appliance is configured such as by a staging program and, in some embodiments, the arrangement is prepared on the appliance based on local (e.g. recorded or previously obtained tracks) and/or downloaded tracks.

In some embodiments, such as when reading (e.g. recording) of a book is not available, a staging program is at least partially prepared based on known or expected words or phrases (terms) to be present and/or related to children books, such as 'car' 'airplane' 'train', 'wind', 'cat', 'dog', 'cow' etc. optionally, the terms are accessed or collected or otherwise obtained from previous reading available to the organization and/or stored in the child's appliance.

It should be appreciated that some embodiments of the invention, such as (but not necessarily limited to) staging, scripting and pointing may be implemented or assisted by using other page identifiers than described herein, for example, using page identifier systems that read RFID codes or bar-codes off of a page in order to identify it.

Pointed terms. In some embodiments, having flagged words in a reading allows a child to point at words (e.g. while browsing a book optionally assisted by an adult) and the respective term would be read, optionally with a personalized voice (e.g. of a celebrity or pet) optionally accompanied by effects such as related sound or echo.

In some embodiments, e.g. according to a designed and coded program, a page (or part thereof) is displayed on a screen such a web page or a connected computer screen or screen of an appliance, and in some embodiments, while a readout is presented via the web page or the appliance or a connected computer, read words (or terms) are highlighted (e.g. bold or colored or with marked background). In some embodiments, a pointer (e.g. a mouse) is used to point at a term on the screen and the term would be read separately. In some embodiments, the program allows, such as by controls on the screen, to increase or decrease the rate of highlight and/or reading the terms.

In some embodiments, highlighting words (or phrases) encourages or allows a child (optionally assisted by an adult) to read the word thereby assisting in reading teaching. Optionally, upon a request (e.g. by a human interface element) the word is read to assist in reading or confirm (by feedback) the child's reading. In some embodiments, upon a request, a plurality of words is illuminated to assist a child in reading such as described above. In some embodiments, upon a request, the rate of highlighting and/or its order is controlled according to the child taste and/or capabilities.

In some embodiments, a book enhancement appliance is configured, for example, by a program to allow faster or slower readout while keeping, at least apparently, the voice and/or effects to intelligible and/or natural. For example, pauses between words may be reduced. Optionally, capability to modify a sound pitch is configured.

In some embodiments, a book enhancement appliance is accompanied and/or equipped (e.g. by a program) with instructions for operating the appliance, optionally aided by one or more audio demos and/or visual demos (e.g. when a screen is available). In some embodiments, a book enhancement appliance is configured by a program to allow book marking, e.g. by storing the current page (or position in a page) for subsequent continuing a readout.

In some embodiments, a book is drawn or written (e.g. scribbled) by a person (e.g. a child) and the book is read as a printed book with further enhancements. In some embodiments, a scenario such as described above is augmented by one or more features or elements of other scenarios providing, in some embodiments, a more flexible and/or more capable and/or richer scenario with augmented experience and/or capabilities and/or effects. For example, a combined plan program and a staging program may be provided.

In some embodiments, other variations are supported, for example, providing (e.g., purchasing) a book enhancement appliance equipped with sound tracks or other capabilities such as books images and/or effects and/or programs (e.g. planning or staging) and/or a toolkit (e.g. for planning or staging) and/or images or video.

In certain embodiments, the appliance is used to provide visual effects such as that of a reader reading pages of the book (e.g. a grandparent). In some embodiments, book enhancements are provided as service such as via a web site. In some embodiments, the service is provided by purchasing and/or renting elements or capabilities of book enhancement allowing income to the service provider. In some embodiments, the service is provided by a web site.

In some embodiments, the service provides book enhancement by providing book enhancement appliances, optionally equipped with sound tracks of books and/or book images and/or together with printed books. In some embodiments, the service provides and maintains a repository of sound and/or video tracks of or related to a book or books. Some examples of using and accessing the repository are described below. In some embodiments, the service provides book enhancement by providing sound tracks (e.g. with effects). In some embodiments, the service provides book enhancement by providing other capabilities such as planning program or staring program or toolkit therefore. In some embodiments, the service provides sound tracks in a foreign language for leaning the language with and according to a book. In some embodiments, the service provides sound tracks that comprise commentary or explanations or annotations of a book. In some embodiments, the service provides capabilities for collaborative reading such as a parent is remote from the child, optionally shown on a screen such as by webcam.

In some embodiments, sound tracks (and/or video clips) of a book or related thereof can be shared among users, optionally or additionally, users can contribute sound and/or video tracks to enrich a book repository.

In some embodiments, connecting to a service repository provides synchronization and/or download of tracks to an appliance (such as appliance 100 or a variation thereof or a smart phone as an enhancement appliance). In some embodiments, the service provides book enhancement by providing one or more programs to configure a smart phone (or other devices and/or components) enabling a book enhancement.

In some embodiments, the service provides other items related to a book. For example, providing other printed material related to a book such as games (e.g. picture puzzles) or picture albums, optionally as online service. In some embodiments, apparatus that can be coupled to an appliance are provided such as video and display units, tactile units or olfactory units.

In some embodiments, the service provides capabilities, such as by connection to the service web site, to record reading of contents of a book. Optionally, subsequently, the recording, optionally with other sound tracks, are obtainable (e.g. by connection to the web site or downloading from the web site) and used for readout on a book enhancement appliance.

In some embodiments, the service provides book enhancement by facilitating the methods described herein.

In some embodiments, a repository of tracks and/or book images is maintained on other computers, such as a user computer. Optionally, repository in a computer is linked with a service. Optionally, the repository is updated, at least partially, from a repository of the service, optionally according to payment or other commercial arrangements such according to contributions of tracks to the service.

Some exemplary operational procedures for using a book enhancement appliance (e.g. appliance 100) are described below. It is noted that the procedures are used as examples, and implicitly imply variations thereof, such as altering order of operations while not hindering the outcome and/or effect of the procedures. For example, the order of recording a page track and page signature computation may be swapped.

FIG. 7A schematically illustrates an outline of operations in reading (recording) pages of a book for book enhancement by a book enhancing apparatus, according to exemplary embodiments of the invention.

A page of a book is presented for viewing by the sensor of the apparatus, such as a camera (702) and the apparatus obtains (derives) a signature of the page, optionally including the page number (704).

A person reads aloud contents of the page (or related thereto) and the reading is recorded (706).

The recording is stored with association of the signature for optional further retrieval (708).

In case more pages are to be read, another page is presented for viewing by the sensor (712), and operation cycle is repeated (710) until no more pages are to be read.

Figure 7B:
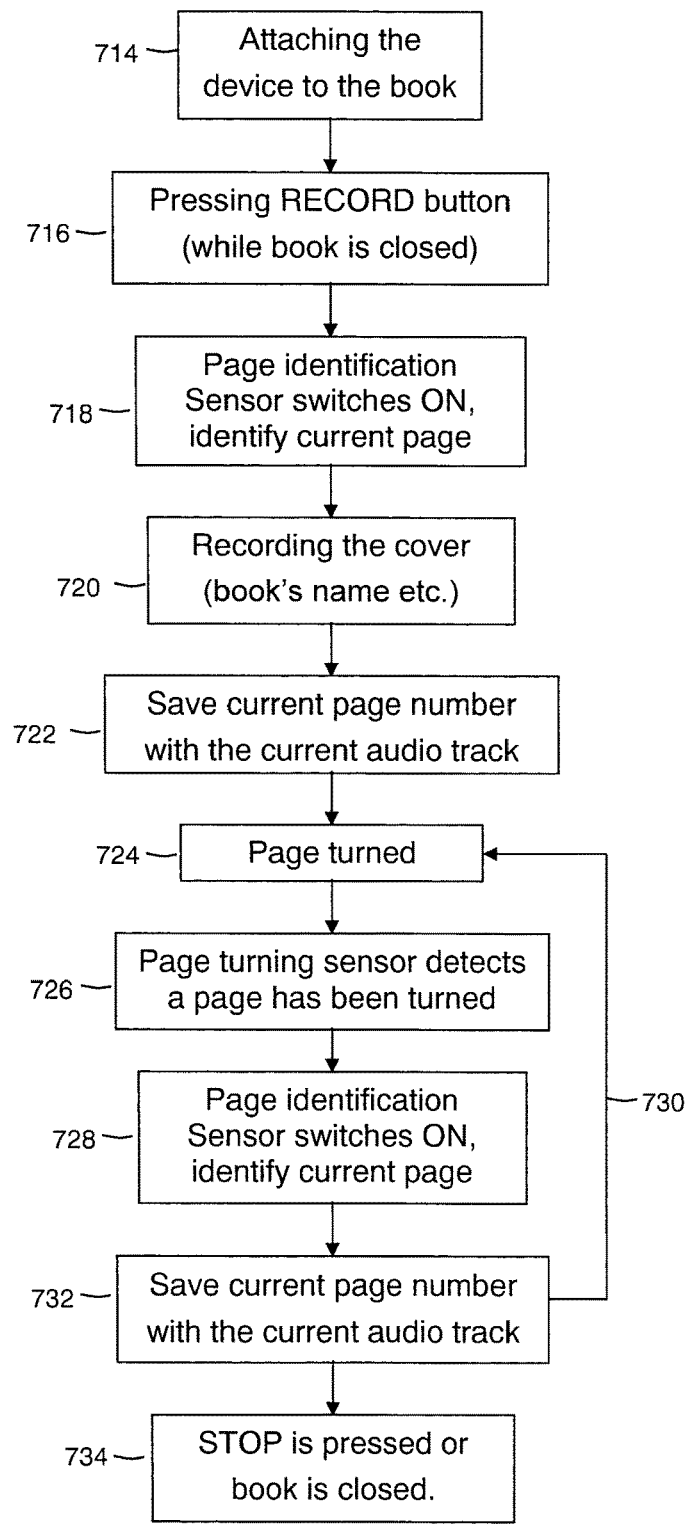
FIG. 7B schematically illustrates operations in reading (recording) a book, according to exemplary embodiments of the invention.

FIG. 7B schematically illustrates operations in reading (recording) a book, according to exemplary embodiments of the invention.

A book is attached to a book enhancing apparatus (or device, or appliance) with the book cover presented to the sensor of the apparatus (714).

Recording is started by pressing a button on the user interface (716), such as 'Record' button on a control panel of the apparatus, and page identification is started, such as by pressing a button on the user interface (718) and page identification operation is started. Optionally, page identification is momentary and stops after a signature is obtained.

The book cover is read (e.g. name, author or other description) and recorded (720) and the recording is saved with the page identification (722), comprising or constituting page number where optionally cover page number is 0 or another particular number.

A page is turned (724) and page turning event is triggered (726) (e.g. by a detector on the page).

Page identification is switched on, identifying the currently open page (728) and the current audio (reading sound) is saved with the page identification (732). Optionally, page identification is momentary and stops after a signature is obtained.

If more pages are to be read, the cycle repeats (730) until the book is stopped wherein a button is pressed such as 'Stop' button on a user interface (734).

Figure 7C:
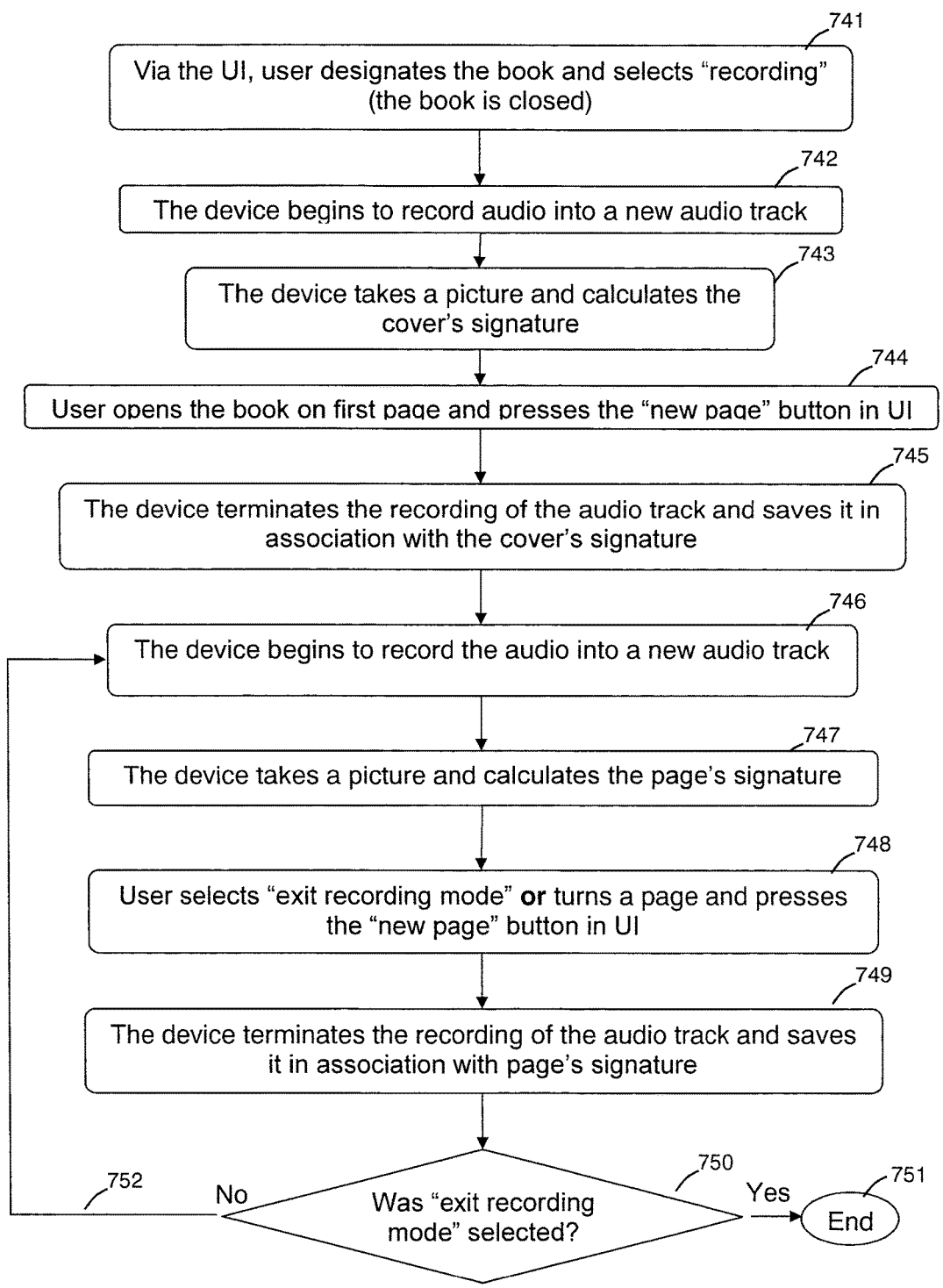
FIG. 7C schematically illustrates operations in reading (recording) a book with a top viewing appliance, according to exemplary embodiments of the invention.

FIG. 7C schematically illustrates operations in reading (recording) a book with a top viewing appliance, according to exemplary embodiments of the invention.

A book is selected, book still closed, and the recording is activated such as by User Interface (741). The appliance starts recording a new audio track (742) and captures an image of the book cover and calculates the signature thereof (743). The first page of the book is opened and a 'new page' event is activated (744). The recording of the audio track is terminated and saved in association of the book cover signature (745). The appliance begins to record the reading of the opened page in a new audio track (746). The image of the page is captured and the page's signature is calculated (747). If reading is over an 'exit recording mode' is activated, or if other pages are to be read a 'new page' is activated (748). The recording of the audio track of the page is terminated, and the track is saved in association with the signature of the page (749). The appliance checks whether 'exit recording mode' was activated (750). If the mode was activated then the reading is done (751). Otherwise, another operation cycle is resumed (752) with recording of another page (746).

Figure 7D:
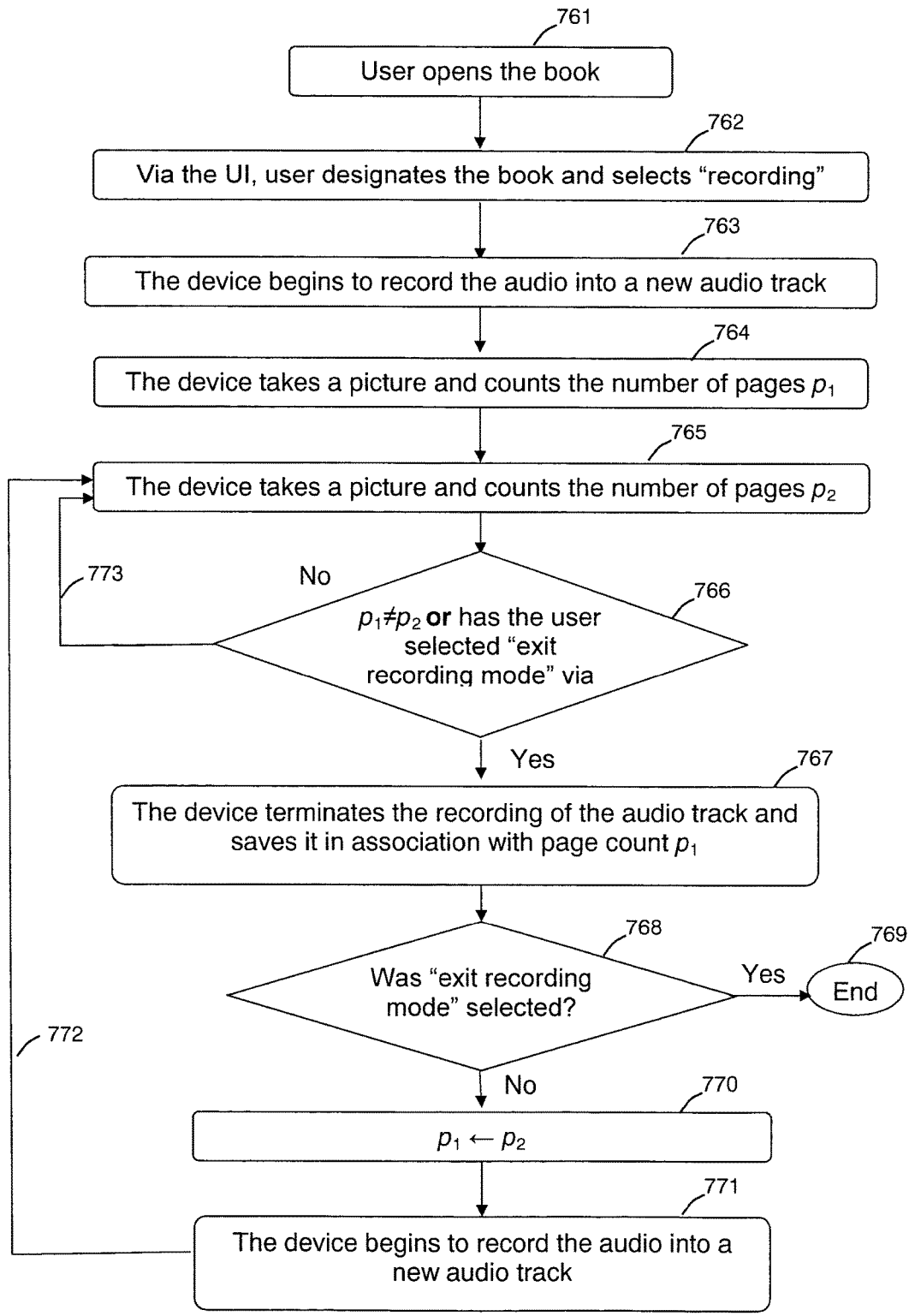
FIG. 7D schematically illustrates operations in reading (recording) a book with an edge viewing appliance, according to exemplary embodiments of the invention.

FIG. 7D schematically illustrates operations in reading (recording) a book with an edge viewing appliance, according to exemplary embodiments of the invention. A book is opened (761). A book is selected such as via the User Interface and 'recording' is activated (762) and an audio track begins to be recorded into a new audio track (763). An image of the stack of pages (at the thickness of the book) is captured and the numbers of the of pages (count) p1 in the stack is calculated (764). An image of the stack of pages is taken and the number of pages p2 in the stack is calculated (765). The appliance checks for a condition of whether p1≠p2 or whether 'exit recording mode' was activated (766). If the condition is not met, another operation cycle is resumed (773) with taking an image of the stacks and calculation of the number of pages in the stack (765). If the condition is met, the recording of the audio track is terminated and saved in association of the page count p1 (767). The appliance checks whether 'exit recorded mode' was activated (768). If the mode was activated the reading is done (769). Otherwise, another operation cycle is resumed (772) with taking an image of the stacks and calculation of the number of pages in the stack (765).

Figure 8A:
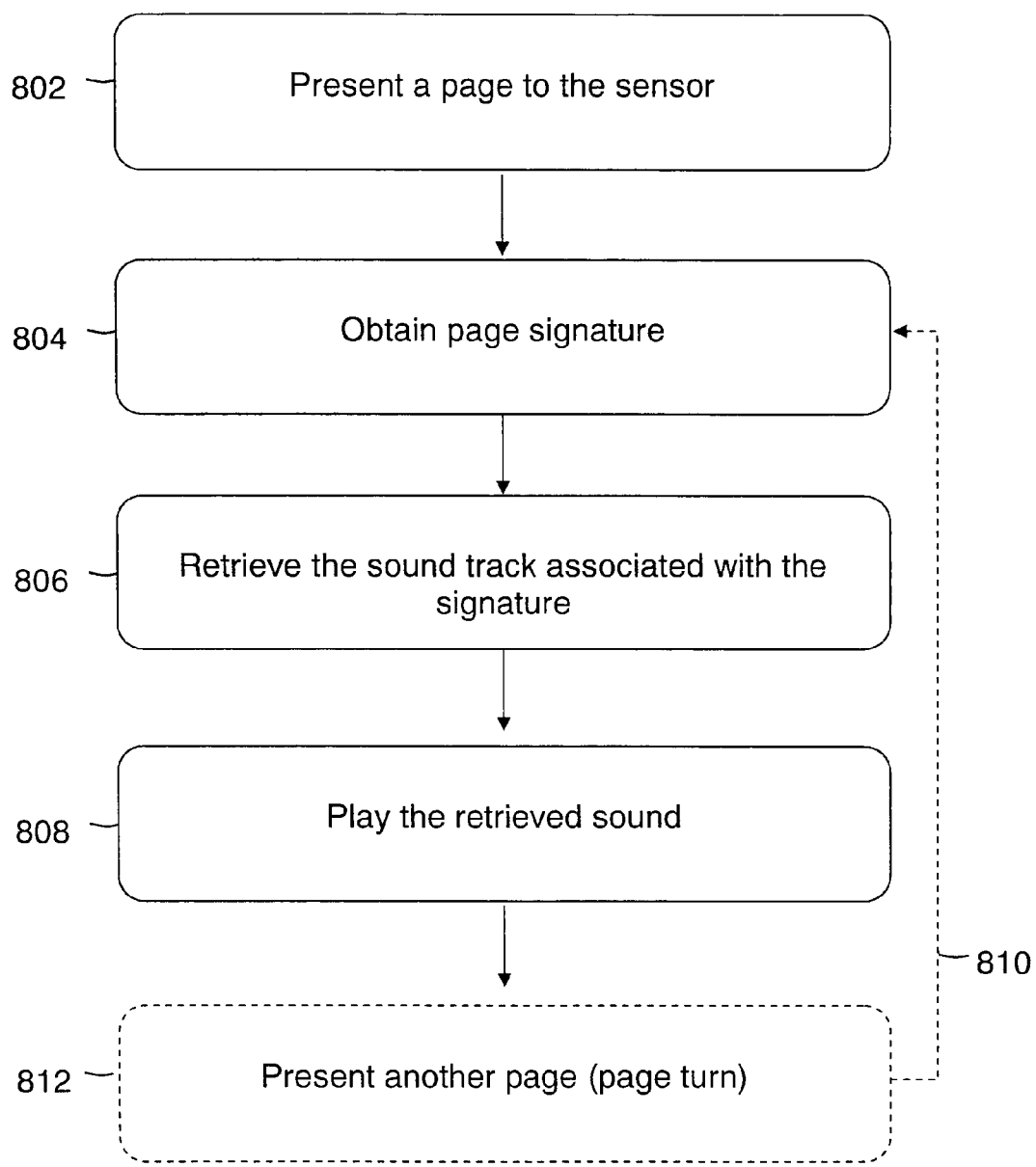
FIG. 8A schematically illustrates an outline of operations in readout (playing) pages of a book, according to exemplary embodiments of the invention.

FIG. 8A schematically illustrates an outline of operations in readout (playing) pages of a book, according to exemplary embodiments of the invention. A page of a book is presented for viewing by the sensor of the apparatus, such as a camera (802) and the apparatus obtains (derives) a signature of the page, optionally including the page number (804). A stored sound track (see 708 in FIG. 7A) associated with the signature is located and retrieved (806) and played (readout) (808). In case more pages are to be played, another page is presented for viewing by the sensor (812), and the cycle is repeated again (810) until no more pages are to be read.

Figure 8B:
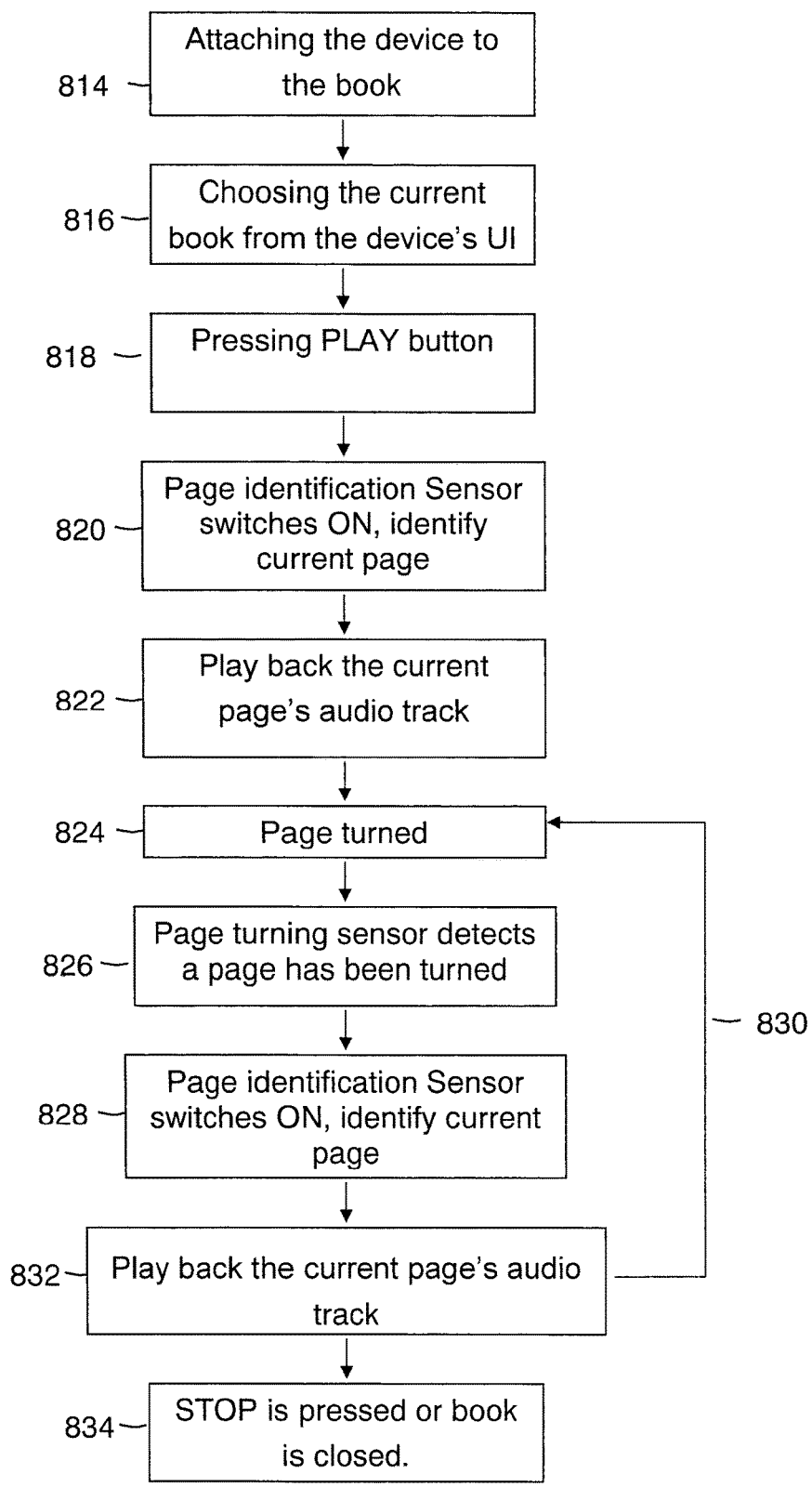
FIG. 8B schematically illustrates operations in readout (playing) of a book, according to exemplary embodiments of the invention.

FIG. 8B schematically illustrates operations in readout (playing) of a book, according to exemplary embodiments of the invention. A book is attached to a book enhancing apparatus (or device, or appliance) with the book cover presented to the sensor of the apparatus (814). The book is selected using the user interface (such as code of a book or name if a screen is used) (816). Readout is started by pressing a button of the user interface, such as a 'Play' button (818) and page identification is started (820). According to stored recording, a sound track associated with the page signature (and/or number) is started or readout (822). Optionally, page identification is momentary and stops after a signature is obtained. When a page is turned (824) page turning event is triggered (826) (e.g. by a detector on the page) and page identification is started (828). According to the stored recording, a sound track associated with the current page signature (and/or number) is started or readout (832). If more pages are to be read, the cycle repeats (830) until the book is stopped wherein a button is pressed such as 'Stop' button on a user interface (834). Book readout with a top view appliance (playback)

Figure 8C:
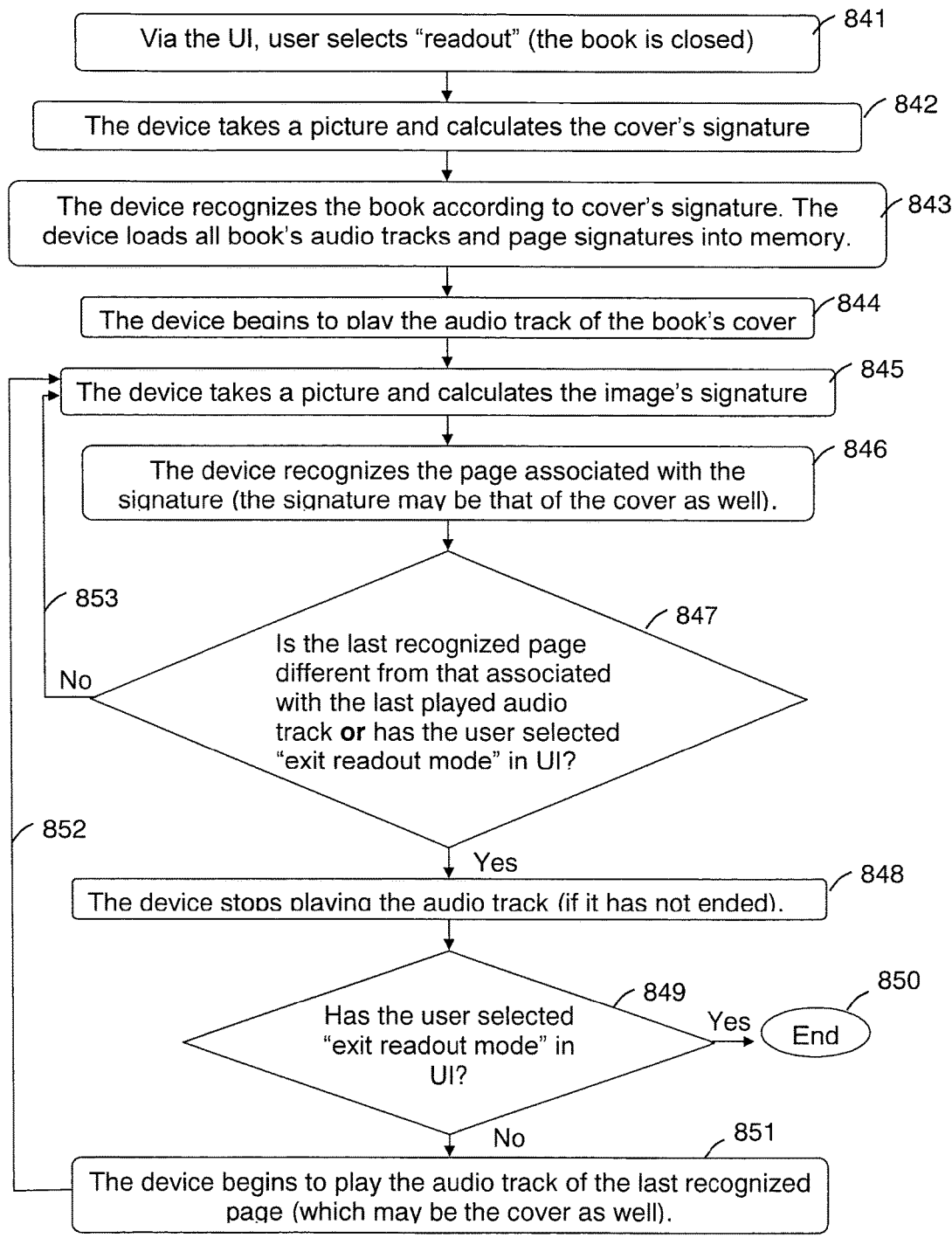
FIG. 8C schematically illustrates operations in readout (playing) of a book with a top viewing appliance, according to exemplary embodiments of the invention.

FIG. 8C schematically illustrates operations in readout (playing) of a book with a top viewing appliance, according to exemplary embodiments of the invention. A book is selected, book still closed, and the 'readout' is activated such as by User Interface (841). An image of the cover is captured and the signature of the cover is calculated (842). The book is recognized according to the cover signature, and the audio tracks and associated page signatures are loaded into a memory such as RAM (843). The audio track of the cover is readout i.e. played (844).

An image is captured and the signature thereof is calculated (845), and a page related (or associated) with the signature is recognized (846). The appliance checks for a condition of whether the last recognized page is different from that associated with the last played audio track or whether an 'exit readout mode' was activated (874). If the condition is not met, another operation cycle is resumed (853) with taking an image and calculating the respective signature (845). If the condition is met, the readout of the audio track is terminated, unless it has already stopped after the entire track was played (848). The appliance checks whether 'exit readout mode' was activated (849). If the mode was activated the readout is done (850). Otherwise, another operation cycle is resumed (852) with taking an image and calculating the respective signature (845).

FIG. 8D schematically illustrates operations in readout (playing) of a book with an edge viewing appliance, according to exemplary embodiments of the invention. A book is opened (861). A book is selected such as via the User Interface and 'readout' is activated (862). An image of the stack of pages (thickness) is captured and the number of pages (count) p1 is calculated (863). Readout of an audio track associated with page count p1 is activated (864). An image is captured and the number of pages p2 is calculated (865).

The appliance checks for a condition of whether p1≠p2 or whether 'exit readout mode' was activated (866). If the condition is not met, another operation cycle is resumed (873) with taking an image of the stacks and calculation of the number of pages in the stack (865). If the condition is met, the readout of the audio track is terminated, unless it has already stopped after the entire track was played (867). The appliance checks whether 'exit readout mode' was activated (868). If the mode is activated then the readout is done (869). Otherwise page count p1 is set as p2 (870). Readout of audio track associated with page count p1 is started (871) and another operation cycle is resumed (872) with image captured and calculation of page count (865).

Figure 9:
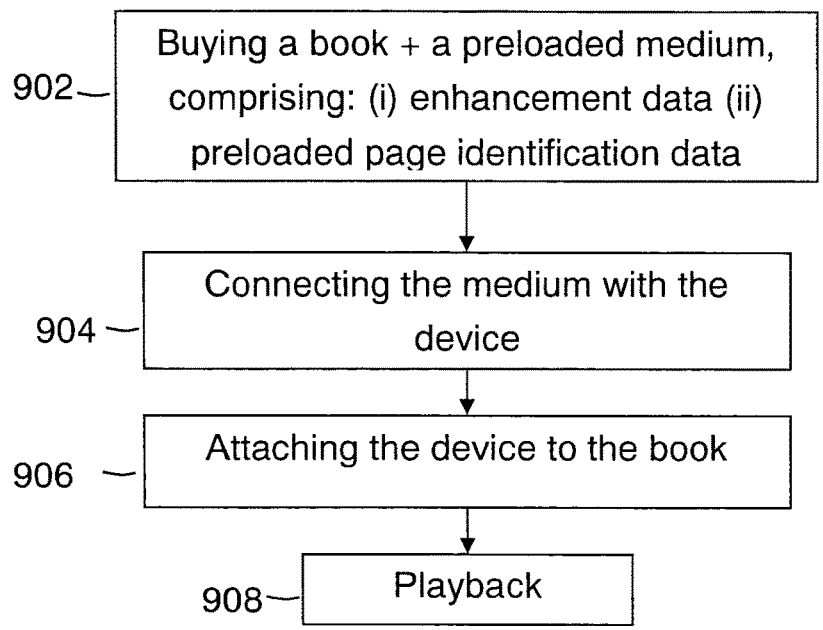
FIG. 9 schematically illustrates an outline of operations in purchasing a book with enhancement sounds, according to exemplary embodiments of the invention.

FIG. 9 schematically illustrates an outline of operations in purchasing a book with enhancement sounds, according to exemplary embodiments of the invention. A book is purchased such as in shop on online shopping service, wherein the book is accompanied or bundled with enhancement sound tracks and association of the sound tracks with pages of the book on a medium such as card or USB drive (902). The medium is connected to a book enhancement device (904), the book attached to the device (906) and a readout of the book is started (908) such as described above (e.g. according to FIG. 8A-B).

Figure 10:
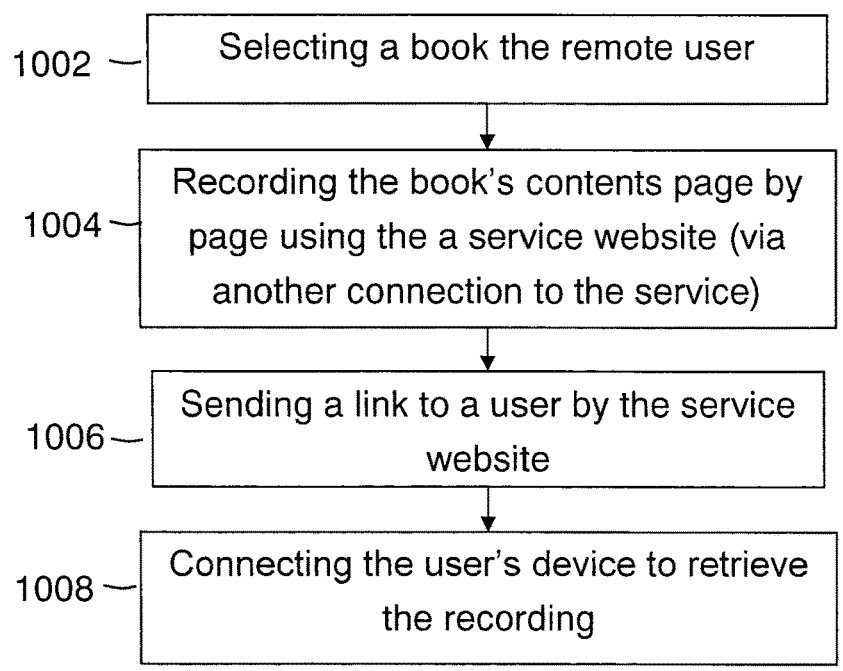
FIG. 10 schematically illustrates an outline of operations in personalized remote recording a of book enhancement, according to exemplary embodiments of the invention.

FIG. 10 schematically illustrates an outline of operations in personalized remote recording a of book enhancement, according to exemplary embodiments of the invention. Selecting via a service web site a book a user of a book enhancement device possesses (1002). Optionally, such selecting includes selecting a particular edition, optionally based on an image of the cover or one or more pages in the book. Recording, based on capabilities of the web site (and optionally the device), contents of the book, optionally, of every page and, optionally, in the order of the pages (1004). Establishing a link between the web site and the device (e.g. sending a link as URL) (1006) and retrieved the recording based on the link (1008).

In some embodiments, readout of a book may comprise an exemplary script comprising an arrangement of sound and/or visual tracks and effects, as well as other sensory effects such as tactile (e.g. vibration) or olfactory (e.g. release of fragrance). In some embodiments, the arrangement of a readout ('staging') is practiced by using a script, implemented such as by one or more sets of definitions. One or more programs of instructions or rules executable by a processor and/or other electronic circuitries carry out the definitions in the script.

Effects can be associated in certain embodiments with certain words, meaning that a different effect should be defined if different parameters are desired, thus promoting variability. Each action has different parameters; where the parameters have the same meaning regardless of the effect.

In some embodiments, a kit is provided for employing as a book enhancement apparatus a portable device such as a smart phone or tablet device or other programmable portable devices comprising at least a camera and a microphone (generically termed a smart phone, even if no telephone capability provided).

In some embodiments, the kit comprises a device such as a memory card or other media such as USB disk comprising or containing a program readable and executable by the smart phone, wherein the program is designed and coded to employ the smart phone as a book enhancement apparatus. In some embodiments, instead of a device a link is provided to a service providing the program such as by downloading.

In some embodiments, the kit comprises a support for the smart phone for suitable viewing of a book. In some embodiments, the kit comprises a smart phone. In some embodiments, the program is compatible with a particular smart phone. Optionally, the kit is compatible with a plurality of smart phones such as of a family of smart phones or smart phones having common support by a particular operating system or providing a common virtual environment (e.g. emulation of other phones).

Figure 11:
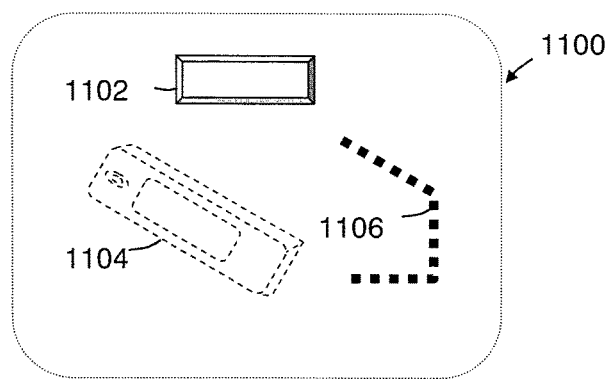
FIG. 11 schematically illustrates a kit for a book enhancement appliance based on a standard device, according to exemplary embodiments of the invention.

FIG. 11 schematically illustrates a kit 1100 for a book enhancement appliance based on a standard device, according to exemplary embodiments of the invention. The kit comprises a medium component 1102 such as a memory card or other media such as USB disk comprising or containing a program readable and executable by the smart phone. Optionally, the component comprised (e.g. programmed) a link to a service providing the program. Optionally, the component is a tag depicting the link.

In some embodiments, kit 1100 comprises a smart phone compatible with the program. In some embodiments, kit 1100 comprises a support for the smart phone in viewing a book. In some embodiments, the kit comprises instruction how to use the module and/or how to connect to retrieve the program, and optionally how to used the smart phone as a book enhancement appliance.

Figure 12A:
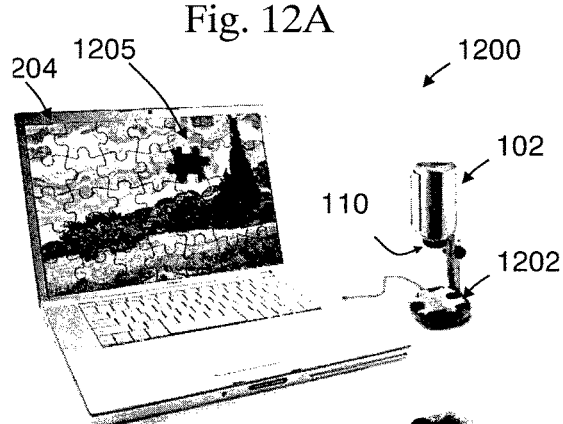
FIG. 12A schematically illustrates an embodiment of a "microscope-like" puzzle enhancement appliance, in accordance with exemplary embodiments of the invention.

FIG. 12A schematically illustrates an embodiment of a "microscope-like" puzzle enhancement appliance 1200, in accordance with exemplary embodiments of the invention. A puzzle piece 1202 is seated on base and the camera 110 is mounted on a camera support 102 providing a close-up analysis of the puzzle piece. User interlace such as user interface 1204 may give a feedback of the suggested position 1205 of the puzzle piece.

Figure 12B:
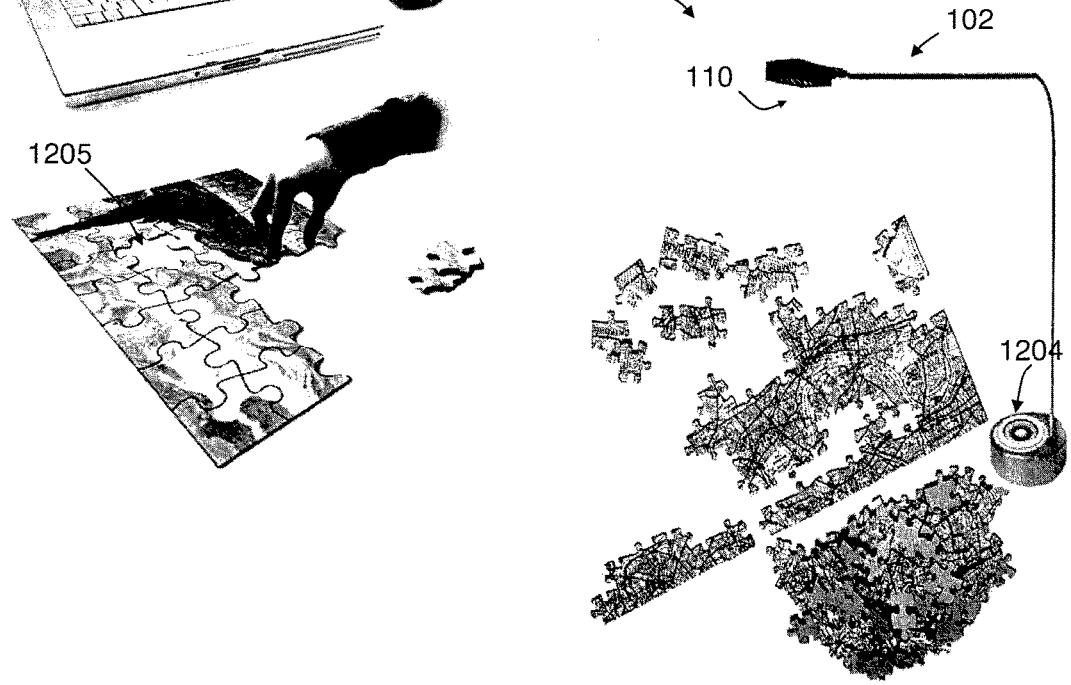
FIG. 12B schematically illustrates a general view of an embodiment of a puzzle enhancement appliance for top viewing, in accordance with exemplary embodiments of the invention.

FIG. 12B schematically illustrates a general view of a puzzle enhancement appliance 1200 for top viewing, in accordance with exemplary embodiments of the invention. A camera 110 is mounted on a camera support 102 providing a top view analysis of the puzzle pieces. User interface such as user interface 1204 may give feedbacks associated with player's moves.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

It is expected that during the life of a patent maturing from this application many relevant sensing and processing technologies will be developed or enhanced and the scope of the term 'sensing' is intended to include all such new technologies a priori.

As used herein the term "about" refers to ~10%. The terms "comprises", "comprising", "includes", "including", "having" and their conjugates mean "including but not limited to".

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for enhancing a conventional readable medium, comprising: a portable reading enhancement appliance operably coupled to the conventional readable medium and to a non-volatile memory having stored thereon a plurality of enhancements, said reading enhancement appliance comprising:
   i. a processor;
   ii. a plurality of sensors, wherein the sensors include a camera, and
   iii. a plurality of transducers,
   wherein said portable reading enhancement appliance being operable to perform:
      identifying an acoustic or visual trigger event associated with the conventional readable medium;
      communicating a stored enhancement in response to the acoustic or visual trigger event;
      capturing an image of each of a plurality of portions of the conventional readable medium by using the camera and producing a plurality of reference signatures wherein each reference signature is related to a corresponding captured image by applying a mathematical coding function on each captured image, wherein each reference signature is unique to the corresponding portion of the conventional readable medium,
      recording the plurality of enhancements by using an input transducer of the plurality of transducers;
      storing each reference signature in association with a corresponding recorded enhancement in the memory;
      capturing an image of a current portion of the conventional readable medium by using the camera, producing a current signature related to the captured image by applying the mathematical coding function on the captured image;
      comparing the current signature with each of the plurality of reference signature retrieved from the memory, wherein said comparing includes evaluating a mathematical similarity function applied on the current signature and each reference signature to determine a degree of similarity between the current signature and each reference signature, wherein for a selected pair of the current signature and one of said plurality of stored reference signatures, if the compared locations differ by at most a preselected number of pixels and if the compared sizes differ by at most a preselected value, then setting a dissimilarity value for the selected pair to be an inverse cosine of an inner product of the difference in pixel number between the selected pair and difference in sizes between the selected pair;
      considering said degree of similarity to determine whether or not there is a match, wherein a match is determined for a pair having a lowest dissimilarity value, where the dissimilarity value is less than a predetermined dissimilarity threshold; and
      if a match has been determined, retrieving the corresponding enhancement stored in the memory in association with the matched reference signature, and playing back the retrieved enhancement by using an output transducer of the transducers.

2. The system of claim 1, wherein the acoustic or visual trigger event comprises an identification of a page in the conventional readable medium.

3. The system of claim 2, wherein the acoustic or visual trigger event comprises a page turning associated with the conventional readable medium.

4. The system of claim 1, wherein the enhancement comprises enhancement of the contents of the conventional readable medium acoustically and/or visually.

5. The system of claim 1, wherein the mathematical coding function comprises the following operations:
   a. converting the image into a gray-scale format if the image is a color image;
   b. detecting different features of the image in the gray-scale format;
   c. obtaining a location and dimension of the detected features;
   d. obtaining a descriptor for each of the detected features, the descriptor encapsulating statistical data in the direction of luminous intensity gradient in the region corresponding to the feature; and
   e. providing the set of the detected features in connection with the corresponding descriptors as the reference signature or the current signature.

6. The system of claim 1, wherein said plurality of enhancements is recorded by downloading external data from an external source.

7. The system of claim 1, wherein said system is configured to identify a current page based on a thickness gauged by one of an imaging sensor and a mechanical sensor.

8. The system of claim 1, wherein said current signature is one of a sequence of numbers related to the captured image and a hash value related to the captured image.

9. The system of claim 1, wherein said processor is configured to produce the current signature based on one of at least one distinctive feature, page structure, a pattern of light and dark and/or color or shades of gray areas related to the captured image.

10. The system of claim 1, wherein said plurality of enhancements is downloaded from an external source.

11. The system according to claim 1, further including one of a cellphone, a computer, and a server configured at least for storing said memory.

12. The method of claim 1, wherein each reference signature is a hash value related to the corresponding captured image.

13. The method of claim 1, wherein said producing a current signature includes producing one of a sequence of numbers related to the captured image and a hash value related to the captured image as the current signature.

14. The method according to claim 1, wherein at least one of said producing, comparing, and retrieving is performed on one of a cellphone and a computer.

15. The system according to claim 1, wherein said mathematical similarity function returns a scalar value that indicates a degree of similarity between the current signature and each reference signature.

16. The system according to claim 1, wherein said comparing includes comparing a location and size of detected features in the captured image with a location and size of features in each reference signature.

17. The system according to claim 1, wherein said preselected number of pixels is 50 pixels.

18. The system according to claim 1, wherein said preselected value is in the range of from 1/1.3 to 1.3.

19. The system according to claim 1, wherein said predetermined dissimilarity threshold is 0.45 radians.

20. The system according to claim 1 wherein, if no match was determined, calculate a similarity value for each selected signature pair according to the formula N3/(N1+N2), where N1 and N2 denote the number of features in the selected signature pair and N3 denotes a total number of features that are designated as being matched, and determine a match for a selected signature pair having a highest calculated similarity value.

* * * * *